United States Patent
Kisailus et al.

(10) Patent No.: US 12,378,699 B2
(45) Date of Patent: Aug. 5, 2025

(54) METHOD AND SYSTEM FOR PRODUCTION OF POROUS GRAPHITIC CARBON MATERIALS EMBEDDED WITH ACTIVE COMPONENTS

(71) Applicant: THE REGENTS OF THE UNIVERSITY OF CALIFORNIA, Oakland, CA (US)

(72) Inventors: David Kisailus, Riverside, CA (US); Hongjie Tang, Newark, DE (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 1098 days.

(21) Appl. No.: 16/434,911

(22) Filed: Jun. 7, 2019

(65) Prior Publication Data

US 2019/0376209 A1 Dec. 12, 2019

Related U.S. Application Data

(60) Provisional application No. 62/682,690, filed on Jun. 8, 2018.

(51) Int. Cl.
| | | |
|---|---|---|
| D01D 10/02 | (2006.01) |
| B01J 21/06 | (2006.01) |
| B01J 21/18 | (2006.01) |
| B01J 35/39 | (2024.01) |
| B01J 35/58 | (2024.01) |
| C02F 1/32 | (2023.01) |
| C02F 1/72 | (2023.01) |
| D01D 5/00 | (2006.01) |
| H01M 4/36 | (2006.01) |
| H01M 4/525 | (2010.01) |
| H01M 4/587 | (2010.01) |
| H01M 4/90 | (2006.01) |

(52) U.S. Cl.
CPC ............ *D01D 10/02* (2013.01); *B01J 21/063* (2013.01); *B01J 21/18* (2013.01); *B01J 35/39* (2024.01); *B01J 35/58* (2024.01); *C02F 1/32* (2013.01); *C02F 1/725* (2013.01); *D01D 5/003* (2013.01); *H01M 4/364* (2013.01); *H01M 4/525* (2013.01); *H01M 4/587* (2013.01); *H01M 4/9041* (2013.01); *H01M 4/9083* (2013.01); *C02F 2305/10* (2013.01); *D10B 2321/10* (2013.01)

(58) Field of Classification Search
None
See application file for complete search history.

(56) References Cited

PUBLICATIONS

Ji et al., In-situ encapsulation of nickel particles in electrospun carbon nanofibers and the resultant electrochemical performance, Chem. Eur. J. 2009, 15, 10718-10722 (Year: 2009).*

(Continued)

*Primary Examiner* — Coris Fung
*Assistant Examiner* — Keling Zhang
(74) *Attorney, Agent, or Firm* — Buchanan Ingersoll & Rooney PC

(57) ABSTRACT

A method is disclosed for producing carbon fibers with active components such as those for oxygen reduction reactions (ORR). The method includes electrospinning a solution of polyacrylonitrile (PAN) and a transition metal into composite fibers; and annealing the composite fibers in an inert/reducing atmosphere.

15 Claims, 21 Drawing Sheets

(56) References Cited

PUBLICATIONS

Blasi et al., Synthesis and characterization of electrospun nickel-carbon nanofibers as electrodes for vanadium redox flow batteries, Journal of the Electrochemical Society, 165, 2018, A1478-A1485, published May 15, 2018 (Year: 2018).*

Guo et al., Pod-like structured Co/CoOx nitrogen-doped carbon fibers as efficient oxygen reduction reaction electrocatalysts for Zn-air battery, Applied Surface Science, 2018, 959-966, published May 2018 (Year: 2018).*

Candelaria et al., "Nanostructured Carbon for Energy Storage and Conversion", Nano Energy, vol. 1, Issue 2, Mar. 2012, pp. 195-220.

Cavaliere et al., "Electrospinning: Designed Architectures for Energy Conversion and Storage Devices", Energy & Environmental Science, vol. 4, 2011, pp. 4761-4785.

Chen et al., "A Review on Non-Precious Metal Electrocatalysts for PEM Fuel Cells", Energy & Environmental Science, vol. 4, 2011, pp. 3167-3192.

Chen et al., "Platinum-Based Nanostructured Materials: Synthesis, Properties, and Applications", Chemical Reviews, vol. 110, No. 6, 2010, pp. 3767-3804.

Cho et al., "Kirkendall Effect: Nanofibers Comprising Yolk—Shell Sn@void@SnO/SnO 2 and Hollow SnO/SnO 2 and SnO 2 Nanospheres via the Kirkendall Diffusion Effect and Their Electrochemical Properties", Small, vol. 11, No. 36, Sep. 2015, pp. 4673-4681.

Guo et al., "Active Sites of Nitrogen-Doped Carbon Materials for Oxygen Reduction Reaction Clarified using Model Catalysts", Science, vol. 351, Issue 6271, Jan. 22, 2016, pp. 361-365.

He et al., "High-Rate Oxygen Electroreduction over Graphitic-N Species Exposed on 3D Hierarchically Porous Nitrogen-Doped Carbons", Angewandte Chemie International Edition, vol. 53, Issue 36, Sep. 1, 2014, pp. 9503-9507.

Ji et al., "In-Situ Encapsulation of Nickel Particles in Electrospun Carbon Nanofibers and the Resultant Electrochemical Performance", Chemistry—A European Journal, vol. 15, Issue 41, Oct. 19, 2009, pp. 10718-10722.

Jiang et al., "Understanding the High Activity of Fe—N—C Electrocatalysts in Oxygen Reduction: Fe/Fe3C Nanoparticles Boost the Activity of Fe—Nx", Journal of the American Chemical Society, vol. 138, No. 10, Feb. 23, 2016, pp. 3570-3578.

Li et al., "An Oxygen Reduction Electrocatalyst based on Carbon Nanotube—Graphene Complexes", Nature Nanotechnology, vol. 7, May 27, 2012, pp. 394-400.

Li et al., "Growth of Conformal Graphene Cages on Micrometre-Sized Silicon Particles as Stable Battery Anodes", Nature Energy, vol. 1, Article No. 15029, Jan. 25, 2016, pp. 1-9.

Li et al., "Metal—Air Batteries: Will They Be the Future Electrochemical Energy Storage Device of Choice?", ACS Energy Letters, vol. 2, 2017, pp. 1370-1377.

Li et al., "Nitrogen and Phosphorus Dual-Doped Graphene/Carbon Nanosheets as Bifunctional Electrocatalysts for Oxygen Reduction and Evolution", ACS Catalysis, vol. 5, No. 7, May 27, 2015, pp. 4133-4142.

Li et al., "Stiff Metal—Organic Framework—Polyacrylonitrile Hollow Fiber Composite Membranes with High Gas Permeability", Journal of Materials Chemistry A, vol. 2, No. 7, Jan. 2014, pp. 2110-2118.

Li et al., "Structural and Mechanistic Basis for the High Activity of Fe—N—C Catalysts Toward Oxygen Reduction", Energy & Environmental Science, vol. 9, 2016, pp. 2418-2432.

Liang et al., "Co3O4 Nanocrystals on Graphene as a Synergistic Catalyst for Oxygen Reduction Reaction", Nature Materials, vol. 10, Aug. 7, 2011, pp. 780-786.

Liao et al., "Polyacrylonitrile-derived Polyconjugated Ladder Structures for High Performance All-organic Dielectric Materials", Chemical Communications, vol. 51, No. 50, May 2015, pp. 10127-10130.

Liu et al., "Delineating the Roles of Co3o4 and N-Doped Carbon Nanoweb (Cnw) in Bifunctional Co3o4/ Cnw Catalysts for Oxygen Reduction and Oxygen Evolution Reactions", Journal of Materials Chemistry A, vol. 3, 2015, pp. 11615-11623.

Liu et al., "Enhanced Electrocatalysis for Energy-Efficient Hydrogen Production over CoP Catalyst with Nonelectroactive Zn as a Promoter", Advanced Energy Materials, vol. 7, Issue 15, Aug. 9, 2017, pp. 1-8(1700020).

Molina-Garcia et al., "Effect of Catalyst Carbon Supports on the Oxygen Reduction Reaction in Alkaline Media: A Comparative Study", RSC Advances, vol. 6, 2016, pp. 94669-94681.

Park et al., "Effects of Iron Catalyst on the Formation of Crystalline Domain during Carbonization of Electrospun Acrylic Nanofiber", Synthetic Metals, vol. 150, No. 3, 2005, pp. 265-270.

Peng et al., "Designer Platinum Nanoparticles: Control of Shape, Composition in Alloy, Nanostructure and Electrocatalytic Property", Nanotoday, vol. 4., No. 2, Apr. 2009, pp. 143-164.

Peng et al., "High Performance Fe- and N-Doped Carbon Catalyst with Graphene Structure for Oxygen Reduction"; Scientific Reports, vol. 3, Article No. 1765, May 3, 2013, p. 1-7.

Shang et al., "Electrospun Nitrogen-Doped Carbon Nanofibers Encapsulating Cobalt Nanoparticles as Efficient Oxygen Reduction Reaction Catalysts", ChemElectroChem, vol. 3, Issue 9, Sep. 2016, pp. 1437-1445.

Singhal et al., "Using Common Salt to Impart Pseudocapacitive Functionalities to Carbon Nanofibers", Journal of Materials Chemistry A, vol. 3, 2015, pp. 377-385.

Strickland et al., "Highly Active Oxygen Reduction Non-Platinum Group Metal Electrocatalyst without Direct Metal—Nitrogen Coordination", Nature Communications, vol. 6, Article No. 7343, Jun. 10, 2015, pp. 1-8.

Tahir et al., "One Dimensional Graphitic Carbon Nitrides as Effective Metal-Free Oxygen Reduction Catalysts", Scientific Reports, vol. 5, Article No. 12389, Jul. 23, 2015, pp. 1-10.

Tang et al., "Fe-Doped CoP Nanoarray: A Monolithic Multifunctional Catalyst for Highly Efficient Hydrogen Generation", Advanced Materials, vol. 29, Issue 2, Jan. 11, 2017, pp. 1-6(160244).

Tang et al., "Molecular Architecture of Cobalt Porphyrin Multilayers on Reduced Graphene Oxide Sheets for High-Performance Oxygen Reduction Reaction", Angewandte Chemie International Edition, vol. 52, Issue 21, May 17, 2013, pp. 5585-5589.

Tang et al., "Nanocarbon for Oxygen Reduction Electrocatalysis: Dopants, Edges, and Defects", Advanced Materials, vol. 29, Issue 13, Apr. 4, 2017, pp. 1-9(1604103).

Trogadas et al., "Carbon as Catalyst and Support for Electrochemical Energy Conversion", Carbon, vol. 75, Aug. 2014, pp. 5-42.

Wang et al., "Recent Progress in Cobalt-Based Heterogeneous Catalysts for Electrochemical Water Splitting", Advanced Materials, vol. 28, Issue 2, Jan. 13, 2016, pp. 215-230.

Wu et al., "Nanostructured Nonprecious Metal Catalysts for Oxygen Reduction Reaction", Accounts of Chemical Research, vol. 46, No. 8, Jul. 1, 2013, pp. 1878-1889.

Xie et al., "High-Performance Electrolytic Oxygen Evolution in Neutral Media Catalyzed by a Cobalt Phosphate Nanoarray", Angewandte Chemie International Edition, vol. 56, Issue 4, Jan. 19, 2017, pp. 1064-1068.

Xue et al., "The Thermal Degradation of Polyacrylonitrile", Polymer Degradation and Stability, vol. 58, Issues 1-2, 1997, pp. 193-202.

Yang et al., "A Simple Preparation of Very High Methanol Tolerant Cathode Electrocatalyst for Direct Methanol Fuel Cell based on Polymer-Coated Carbon Nanotube/Platinum", Scientific Reports, vol. 5, Article No. 12236, Jul. 20, 2015, pp. 1-9.

Yu et al., "Encapsulation of Sn@carbon Nanoparticles in Bamboo-like Hollow Carbon Nanofibers as an Anode Material in Lithium-Based Batteries", Angewandte Chemie International Edition, vol. 48, Issue 35, Aug. 17, 2009, pp. 6485-6489.

Zhang et al., "A Review: Carbon Nanofibers from Electrospun Polyacrylonitrile and their Applications", Journal of Materials Science, vol. 49, 2014, pp. 463-480.

Zhang et al., "Co3O4 Nanoparticles Anchored on Nitrogen-Doped Reduced Graphene Oxide as a Multifunctional Catalyst for H2O2 Reduction, Oxygen Reduction and Evolution Reaction", Scientific Reports, vol. 7, Article No. 43638, Mar. 8, 2017, pp. 1-11.

(56) References Cited

PUBLICATIONS

Zhang et al., "Exceptional Rate Performance of Functionalized Carbon Nanofiber Anodes Containing Nanopores Created by (Fe) Sacrificial Catalyst", Nano Energy, vol. 4, Mar. 2014, pp. 88-96.

Zhang et al., "Heteroatom-Doped Graphitic Carbon Catalysts for Efficient Electrocatalysis of Oxygen Reduction Reaction", ACS Catalysis, vol. 5, No. 12, Oct. 23, 2015, pp. 7244-7253.

Zhang et al., "Recent Advances in Electrospun Carbon Nanofibers and their Application in Electrochemical Energy Storage", Progress in Materials Science, vol. 76, Mar. 2016, pp. 319-380.

Zhang et al., "Recent Development of Polymer Electrolyte Membranes for Fuel Cells", Chemical Reviews, vol. 112, 2012, pp. 2780-2832.

Zhang et al., "Synthesis of Nitrogen-Doped Graphene Using Embedded Carbon and Nitrogen Sources", Advanced Materials, vol. 23, No. 8, Feb. 22, 2011, pp. 1020-1024.

Zhu et al., "Magnetic Polyacrylonitrile-Fe@Feo Nanocomposite Fibers—Electrospinning, Stabilization and Carbonization", Polymer, vol. 52, Issue 13, Jun. 8, 2011, pp. 2947-2955.

Zhu et al., "The Marriage and Integration of Nanostructures with Different Dimensions for Synergistic Electrocatalysis", Energy & Environmental Science, vol. 10, 2017, pp. 321-330.

Tseng et al., "Synthesis and Characterization of Polymeric Antioxidants Based on Oligo(styrene-co-chloromethyl styrene)", Polymer Degradation and Stability, (Dec. 1997), vol. 58, No. 3, pp. 241-245.

Wang et al., "Electrospun Carbon-Cobalt Composite Nanofiber as an Anode Material for Lithium Ion Batteries", Scripta Materialia, (Mar. 2008), vol. 58, No. 5, pp. 405-408.

Wang et al., "Electrospinning Synthesis of C/Fe3O4 Composite Nanofibers and Their Application for High Performance Lithium-ion Batteries", Journal of Power Sources, (Sep. 1, 2008), vol. 183, No. 2, pp. 717-723.

Wang et al., "Electrochemical Performance of carbon/Ni Composite Fibers From Electrospinning as Anode Material for Lithium Ion Batteries", Journal of Materials Chemistry A, (2013), vol. 1, pp. 1368-1373.

\* cited by examiner

METHOD AND SYSTEM FOR PRODUCTION OF POROUS GRAPHITIC CARBON MATERIALS EMBEDDED WITH ACTIVE COMPONENTS

CROSS-REFERENCE TO RELATED APPLICATION

This application claims priority to U.S. Provisional Application No. 62/682,690, filed Jun. 8, 2018, the entire content of which is incorporated herein by reference.

GOVERNMENT CLAUSE

This invention was made with government support under contract number Contract FA9550-15-1-0009 awarded by the U.S. Air Force Office of Scientific Research. The government has certain rights in this invention.

FIELD OF THE INVENTION

The disclosure relates to a method and system for production of porous graphitic carbon fibers embedded with active components, and more particularly to a method and system for production of a one-dimensional porous nitrogen-doped graphitic carbon fibers embedded within active oxygen reduction reaction (ORR) components.

BACKGROUND

Oxygen reduction reactions (ORR) plays an important role in renewable energy technologies, such as in fuel cells and metal-air batteries. Although platinum (Pt) has been long known as the most efficient ORR catalyst, its high cost and scarcity have hampered the large-scale commercialization of fuel cell and metal-air battery technologies. In particular, commercialization of the fuel cell technology has been further limited by the poor operation durability, fuel crossover effect, and CO poisoning intrinsically associated with Pt catalysts. Consequently, nonprecious carbon or metal oxide catalysts have been explored as alternative electrocatalysts for ORR.

Carbon materials, including carbon nanotubes (CNTs), graphene, and porous carbons with unique physicochemical structures, excellent electric/thermal conductivities, and multiple catalytic active sites, are of particular interest as low-cost electrocatalysts for a variety of redox reactions. Doping these carbon nanomaterials with heteroatoms (e.g., N, S, B, P) or forming heterostructures with transition metal/metal oxides (e.g., Fe, Co, Ni, Mn) could modulate their chemical activities. However, the low conductivity of most carbon-based structures and poor interfacial engineering of heterostructures still greatly impedes the transport of electrons and electrolyte ions during the electrochemical processes, limiting their overall oxygen reduction performance. One-dimensional (1D) graphitic structures, which provide the necessary charge conductivity and favored three-dimensional (3D) conductive networks when assembled as fuel cell electrodes, have been considered as a promising solution to the above challenges.

Electrospinning is a convenient and widely used scalable method to quickly obtain 1D nanostructures. A variety of polymers, polymer/inorganics, and inorganic fibers can be readily electrospun, heat treated, and used in applications such as filtration, chemical adsorption or sensors due to their tunable surface features and enhanced functionalities introduced by the loaded particles. In addition, fibrous nanostructures exhibit outstanding charge transport properties owing to their high aspect ratios, effectively reducing electron scattering at interfaces and grain boundaries, which feature could enhance the efficiency of various electrochemical or photocatalytic devices, such as fuel cells or water purifying membranes.

SUMMARY

A method is disclosed for producing carbon fibers with active components such as oxygen reduction reaction (ORR) components, the method comprising: electrospinning a solution of polyacrylonitrile (PAN) and a transition metal into composite fibers; and annealing the composite fibers in an inert/reducing atmosphere.

A nanocomposite with oxygen reduction reaction (ORR) components is disclosed, the nanocomposite comprising: a solution of polyacrylonitrile (PAN) and a transition metal electrospun into composite fibers; and wherein the composite fibers annealed in an inert/reducing atmosphere to produce a one-dimensional porous nitrogen doped graphitic carbon fibers embedded with active ORR components.

DETAILED DESCRIPTION

Carbon-based nanocomposites have shown promising results in replacing commercial Pt/C as high-performance, low cost, non-precious metal-based oxygen reduction reaction (ORR) catalysts. Developing unique nanostructures of active components (e.g., metal oxides) and carbon materials is essential for their application in next generation electrode materials for fuel cells and metal-air batteries. Herein, a methodology is disclosed for the production of one-dimensional (1D) porous nitrogen-doped graphitic carbon fibers embedded with active ORR components, (M/$MO_x$, for example, metal or metal oxide nanoparticles) using a facile two-step electrospinning and annealing process. Metal nanoparticles/nanoclusters nucleate within the polymer nanofibers and subsequently catalyze graphitization of the surrounding polymer matrix and following oxidation creates an interconnected graphite-metal oxide framework with large pore channels, considerable active sites and high specific surface area. The metal/metal oxide@N-doped graphitic carbon fibers (N-GCFs), especially $Co_3O_4$, exhibit comparable ORR catalytic activity but superior stability and methanol tolerance versus Pt in alkaline solutions, which can be ascribed to the synergistic chemical coupling effects between $Co_3O_4$ and robust 1D porous structures composed of interconnected N-doped graphitic nanocarbon rings. In accordance with an exemplary embodiment, a novel insight into the design of functional electrocatalysts using electrospun carbon nanomaterials for their application in energy storage and conversion fields is disclosed.

In accordance with an exemplary embodiment, a two-step electrospinning-annealing method to produce porous and electrically conductive one-dimensional N-doped graphitic carbon fibrous networks embedded with catalytic metal (M, i.e., Co, Ni, Fe) or metal oxide ($MO_x$) nanoparticles is disclosed. These 1D nanostructures are formed by electrospinning polyacrylonitrile (PAN) fibers containing transition metal (Co, Ni and Fe) salts and annealing in a reducing atmosphere to yield metal nanoparticles/nanoclusters that catalyze graphitization of the surrounding polymer matrix at greatly reduced temperatures (for example, approximately (~) 800° C.). Subsequent annealing to oxidize the metal nanoparticles creates an interconnected graphite-metal oxide framework with large pore channels, considerable numbers of active sites and high specific surface area. This facile strategy provides new prospects in the development of highly efficient and cost-effective materials for energy conversion and storage applications.

Figures 1A, 1B, 1C:
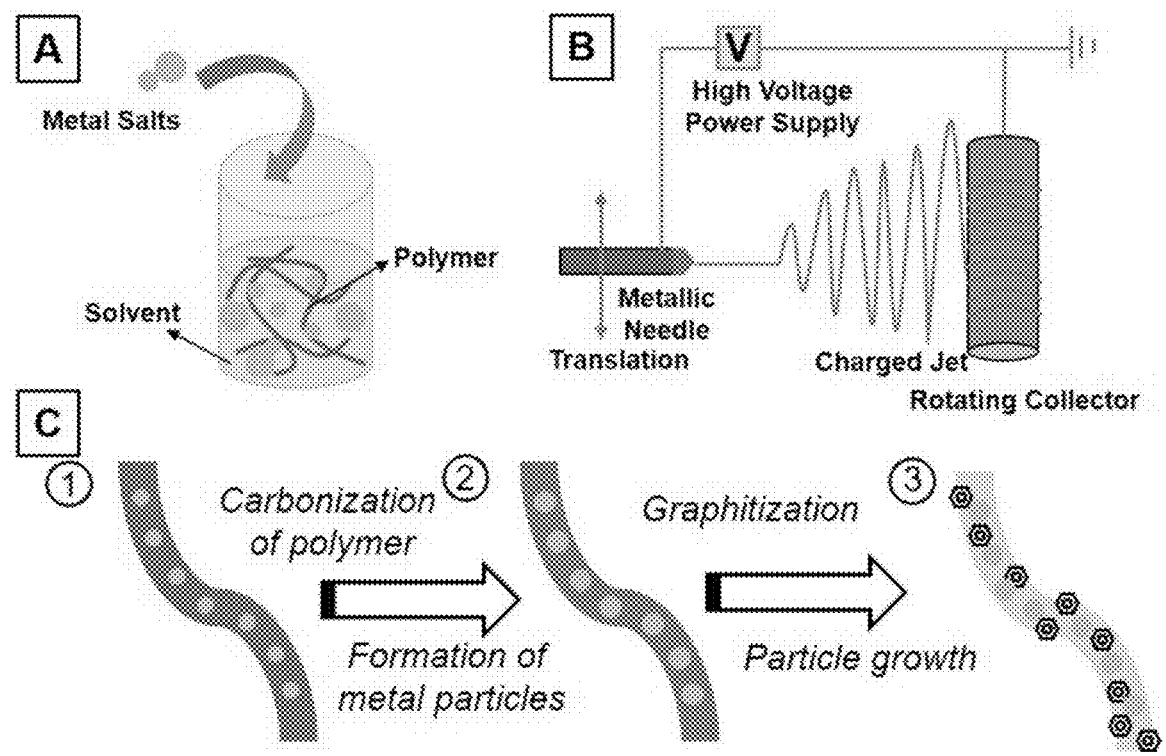
FIGS. 1(a)-1(c) illustrates synthesis strategy of metal NPs@Graphitic carbon fibers by sequential steps: (A) Preparation of electrospun solution of metal salts/polymer/solvent; (B) Electrospinning to obtain metal ions@polymer fibers; (C) Controlled carbonization and graphitization to obtain metal NPs@Graphitic carbon fibers by annealing in inert atmospheres.

In accordance with an exemplary embodiment, a two-step methodology was used to fabricate 1D porous metal/metal oxide@graphitic carbon fibers. In an exemplary synthesis process (FIGS. 1(a)-1(c), a homogenous solution of metal salt (e.g., Co(OAc)$_2$) and a functional polymer are mixed in proper solvents. Specific concentrations and ratios are used to modulate the requisite viscosity and electrical conductivity for electrospinning. Polyacrylonitrile (PAN) was chosen as the polymer carrier for various metal salts, not only because of its known ability to form graphitic carbon upon annealing at high temperature, but because its pendant group contains a nitrile moiety, which can bind to many d-orbital metals. Various parameters for electrospinning were controlled to obtain fine PAN fibers containing the desired concentration of metal salts. As-synthesized metal-ion containing (Co, Fe and Ni)/PAN fibers exhibit a fibrous morphology with a uniform diameter of approximately 634, 921 and 633 nm, respectively (FIGS. 2(a)-2(c)). This correlates to the different interaction behaviors between the transition metal ions and the PAN polymer in DMF, resulting in a modified viscosity and electrical conductivity of electrospun solutions.

Figures 2A, 2B, 2C, 2D, 2E, 2F, 2G, 2H, 2I:
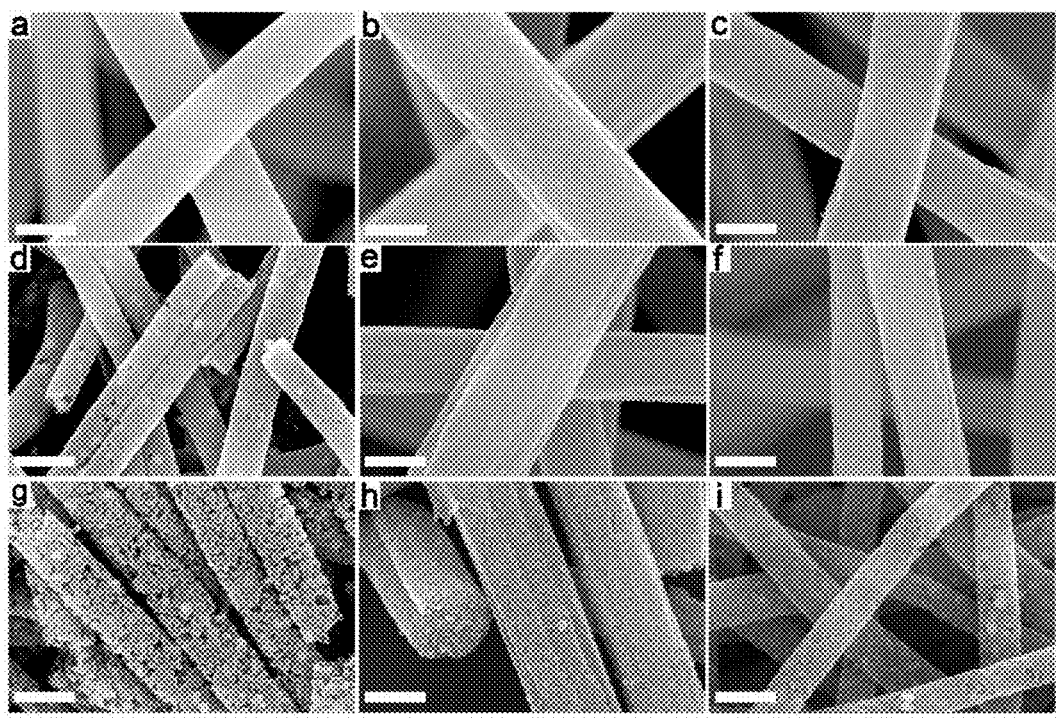
FIGS. 2(a)-2(i) are SEM images of as-electrospun PAN-metal ion containing fibers (a-c, Ni, Fe and Co), Metal nanoparticles@graphitic carbon fibers (d-f, Ni, Fe and Co) and metal oxides@graphitic carbon fibers (g-i, Ni, Fe and Co). The scale bar is 500 nm.

After pre-oxidation of metal/PAN fibers at 250° C. for 4 h under air and subsequent thermal annealing at 800° C. for 3 h in an inert/reducing atmosphere (e.g., 5% H$_2$/95% N$_2$), the metal ions/PAN polymer fibers were converted into 1D porous carbon fibers, containing small graphene domains and nearly monodisperse nanoparticles (FIGS. 2(d)-2(f)). Detailed morphology and phase information of annealed fibers were revealed by TEM and XRD analyses (FIGS. 3(a)-3(i) for the cobalt-based system, and FIGS. 7(a)-10(b) for Ni and Fe-based systems). In accordance with an exemplary embodiment, it was shown that annealing under a reducing atmosphere lead to the clustering and reduction of embedded metal ions, thus precipitating metal nanoparticles (NPs) within the porous carbon fibers (CFs) without apparent aggregation. These transition metal NPs (Co, Fe and Ni) appear to be in intimate contact with the 1D carbon backbones. For example, TEM analysis (FIGS. 3(a)-3(c)) revealed numerous Co nanoparticles with an average diameter of ~20 nm embedded within the fibers and juxtaposed to the internal networks of porous carbon. The presence of an amorphous carbon matrix surrounding these metal ions also restricted their diffusion and thus limited their growth.

Figures 3A, 3B, 3C, 3D, 3E, 3F, 3G, 3H, 3I:
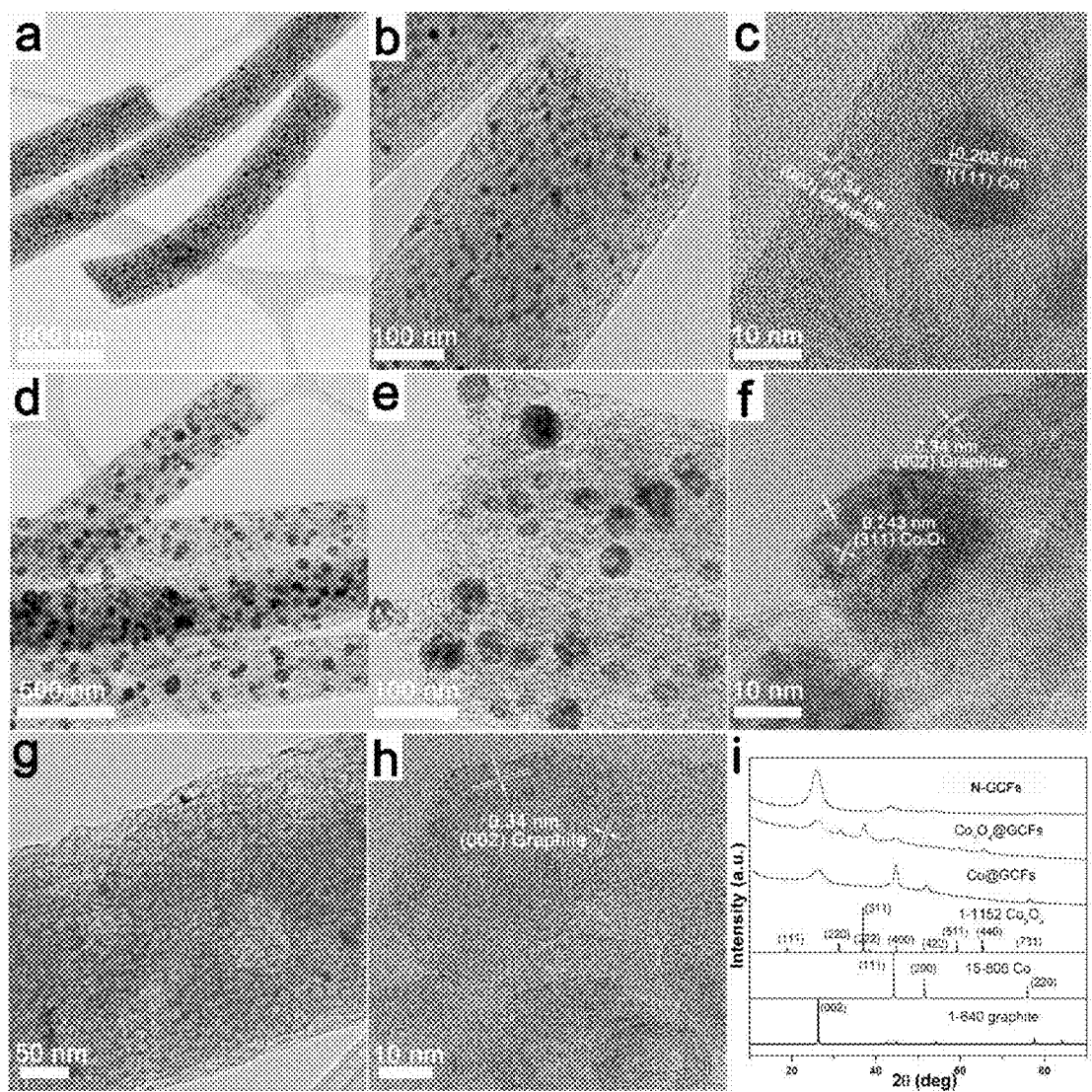
FIGS. 3(a)-3(i) are TEM and HRTEM images of Co@GCFs (a-c), $Co_3O_4$@GCFs (d-f) and N-GCFs (g, h). XRD spectra of Co@GCFs, $Co_3O_4$@GCFs and N-GCFs.

In accordance with an exemplary embodiment, observation of these interfaces between the embedded metal nanoparticles and carbon matrix using high-resolution TEM (HRTEM) imaging (FIG. 3(c)) revealed that the crystalline cobalt nanoparticles are surrounded by well-ordered graphite rings, yielding metal based graphitic carbon fibers (M@GCFs). Examination of XRD of the Co@GCFs prepared at 800° C. (FIG. 3(i)) revealed peaks located at 32.71, 44.41 and 48.51° that are characteristic of the (111), (200) and (220) reflections from the Co nanocrystals (JCPDS card #15-806). In addition, a sharp band exists at 25.21°, corresponding to the (002) reflection of graphite (JCPDS card #1-640). Concentric graphitic nanorings, consisting of 10 layers to 40 layers, are likely the result of the high surface area Co nanoparticles expediting the catalysis of adjacent amorphous carbon into graphitic carbon at a significantly reduced temperature (800° C.). The graphite nanorings are in direct contact with the catalytic transition metal NPs and thus improve the electrical conductivity of the carbon matrix, which is vital for the subsequent electrocatalytic process. It's worth noting that not all transition metal nanoparticles can catalyze the graphitization of amorphous carbon; while Co, Ni and Fe were successful (FIGS. 8(a)-10(b)), Cu and Sn were not. In addition, unlike vapor phase methods that use transition metal nanoparticles (Ni, Fe, etc.) deposited on surfaces to catalyze the growth of graphitic structures (e.g., carbon nanotubes), the method presented here also provides a direct pathway for controlled deposition of metal nanostructures via an in-situ annealing process that can be used to modulate the size and distribution of catalytic particles with concurrent graphitization.

Partial oxidation of the metal NP-containing graphitic carbon fibers at reduced temperatures (ca. 320° C.-360° C.) was used to form metal oxide nanoparticles within the graphitic carbon fiber matrix (MO@GCFs, FIGS. 2(g)-2(i), FIGS. 3(f)-3(i), and FIGS. 9(a)-(f)) for electrocatalysis (see below). XRD analysis of Co$_3$O$_4$@GCFs demonstrates the characteristic diffraction peaks of graphite and Co$_3$O$_4$ phases (JCPDS card #1-1152). In addition, the oxidization process used to convert metal NPs to metal oxides within the fibers resulted in the combustion of residual amorphous carbon at these lower temperatures, yielding fibers with increased porosity and roughness. It is important to note that the temperature was insufficient to oxidize the graphitic nanorings, thus preserving their structure (FIGS. 3(e) and 3(f). FIG. 3(f) shows the distinct Co$_3$O$_4$ (311) facets and (002) graphite layers with d-spacings of 2.43 Å and 3.4 Å, respectively. Subsequent removal of embedded metal nanostructures was achieved using FeCl$_3$/HCl etching, leaving behind one-dimensional porous carbon fibers consisting of 20 nm diameter graphitic carbon nanorings (FIGS. 3(g)-3(h)).

Figures 4A, 4B, 4C, 4D:
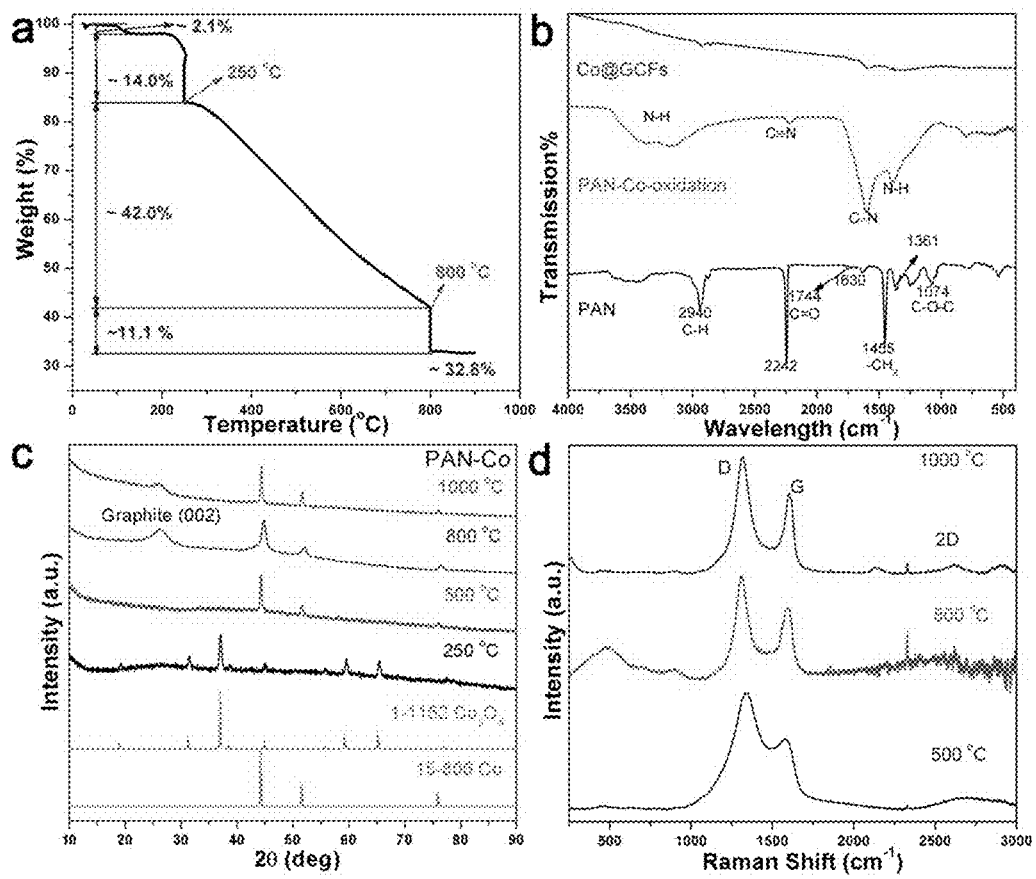
FIGS. 4(a)-4(d) are (a) TGA curve of as-electrospun PAN-Co fibers when annealing to 250° C. under air for 4 h and then to 800° C. under 5% $H_2$/95% $N_2$ and held for 3 h. (b) FTIR spectra of electrospun PAN fibers, PAN-Co-oxidation and Co@GCFs after annealing. (c) XRD comparison of electrospun PAN-Co fibers after annealing at 250, 500, 800 and 1000° C. (d) Raman spectra of PAN-Co fibers annealed at 500, 800 and 1000° C. for 3 h under 5% $H_2$/95% $N_2$.
Figure 11:
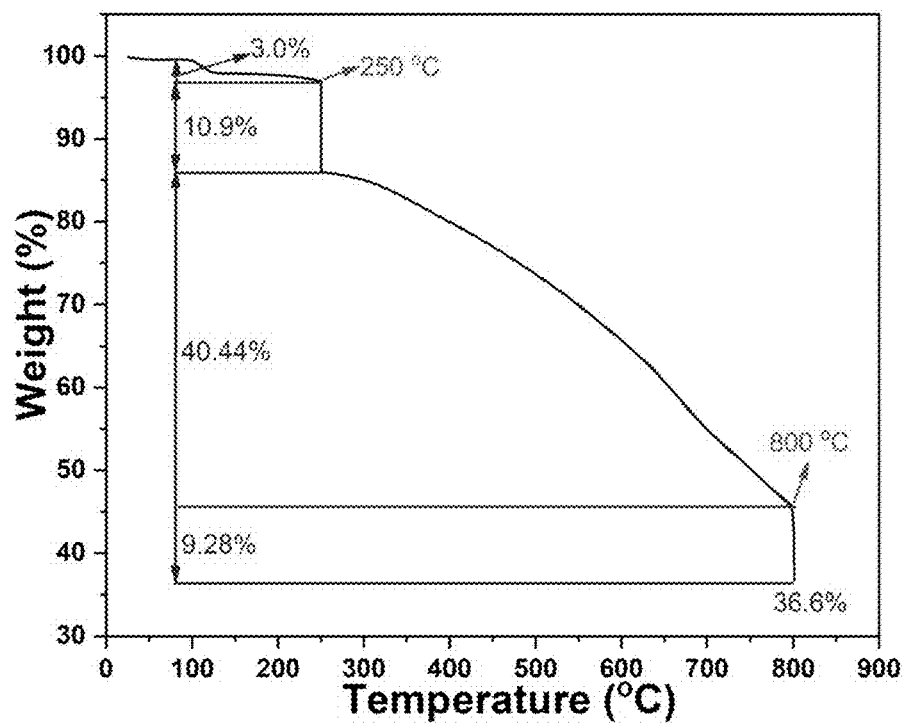
FIG. 11 illustrates a TGA curve of as-electrospun PAN fibers when annealing to 250° C. under air for 4 h and then to 800° C. under 5% $H_2$/95% $N_2$ and held for 3 h.

TGA (annealing in air to 250° C., holding for 4 hours; then in 5% H$_2$/95% N$_2$ to 800° C. and held for 3 h) was used to understand the carbonization and graphitization of polymer fibers (FIG. 4(a), and FIG. 11) as well as the phase transformation of transition metal components. As seen from FIG. 4(a), there is a small weight loss (~2.1%) from 25° C. to 120° C., while a more significant weight loss (~14.0%) occurs upon annealing to 250° C. These losses can be ascribed to the evaporation of bound solvent and the oxidative transformation of PAN, respectively. FTIR (FIG. 4(b)) shows a decrease in the intensity of nitrile (2242 cm$^{-1}$) and CH$_2$ bands (2940, 1455 cm$^{-1}$) with subsequent formation of C=O, C=N and N—H bonds (1744, 1630 and 1361 cm$^{-1}$, respectively). This is consistent with the cyclization mechanisms proposed during oxidative stabilization of unmodified PAN fibers. It is likely that these losses are due to a combination of factors including hydrogen cyanide and methane evolution as well as a large fraction coming from ammonia that is produced from oligomers that are formed by a random scission process from uncyclized polymer. XRD (FIG. 4(c)) indicates that pure crystallized Co$_3$O$_4$ phases form and no distinct graphitic or amorphous carbon peaks exists at this oxidation stage. Additional heating to 800° C. under H$_2$/N$_2$ followed by an isothermal hold for 3 h results in further mass loss (FIG. 4(a), ~42.0% and 11.1%, respectively). FTIR indicates the removal of most residual organics from PAN at 800° C., with only a small signal from C—H and the conjugated C=C of graphite, which is known to reflect poorly in IR. These processes are concurrent with the reduction of metal ions and their catalysis of graphitization of neighboring amorphous/polymeric carbon.

Figure 12:
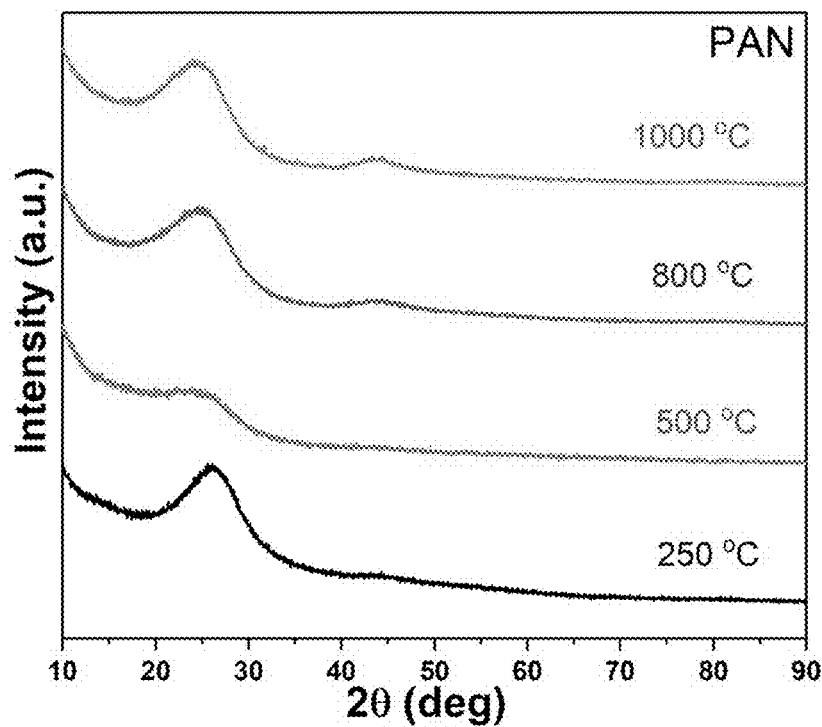
FIG. 12 illustrates an XRD comparison of electrospun PAN fibers after annealing at 250, 500, 800 and 1000° C.
Figure 13:
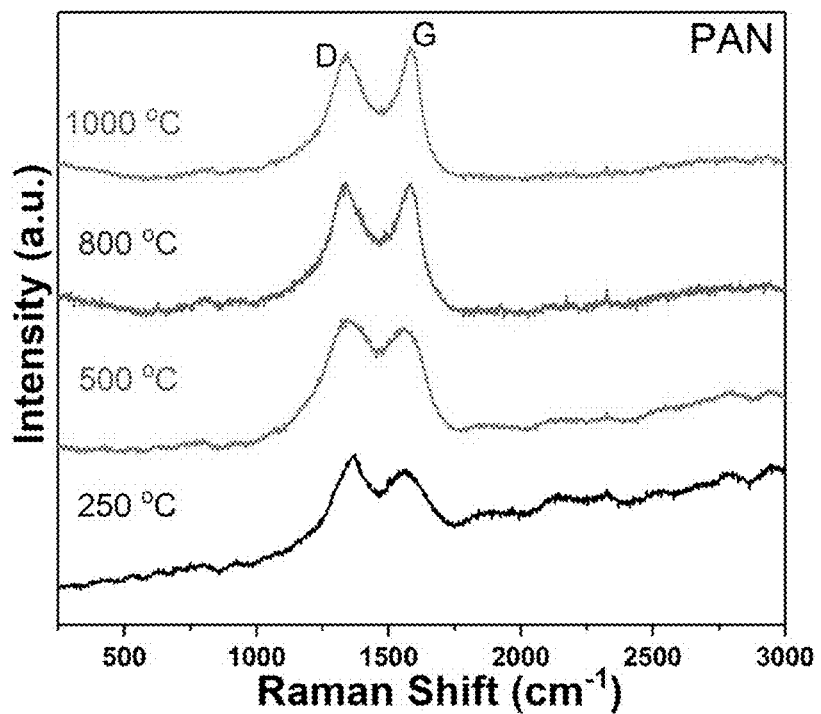
FIG. 13 illustrates a Raman spectra of PAN fibers annealed at 250° C., 500° C., 800° C., and 1000° C. for 3 h under 5% $H_2$/95% $N_2$.

In order to study the crystallization of metal nanoparticles and graphitization of carbon within the fibers, PAN-Co fibers as well as pure PAN fibers were annealed for 3 h under H$_2$/N$_2$ at 250, 500, 800 and 1000° C. Analysis of XRD indicates that the $Co_3O_4$ formed at 250° C. was completely reduced to Co (JCPDS card #15-806) at 500° C. However, no apparent graphitization is observed at this temperature (no significant carbon peak at ~25°). This observation is confirmed with Raman (FIG. 4(d)), which shows a small and broad G peak at 1580 cm$^{-1}$. Further graphitization of carbon and crystallization of metal nanoparticles occurs with increased annealing (i.e., 800 and 1000° C.), which can be deduced from the narrowed full width at half maximum (FWHM) of the (002) graphite and (111) Co peaks, respectively. Additional analyses of the annealed Co@N-GCFs by Raman microscopy revealed the D and G bands of graphitic carbon (at 1357 and 1580 cm$^{-1}$, respectively). Moreover, the value of $I_G/I_D$ increases as the temperature is raised from 500 to 1000° C., indicating a higher degree of graphitization at higher temperatures. In order to assess the role of embedded metal nanoparticles on graphitization, PAN control samples without metal nanoparticles were annealed to 1000° C. XRD confirmed the lack of crystalline graphitic domains (i.e., broad polymeric/amorphous carbon ~25° is observed, FIG. 12) while Raman shows indistinct D and G peaks (FIG. 13), thus confirming the catalytic nature of the metal nanoparticles on graphitization.

Figures 5A, 5B, 5C:
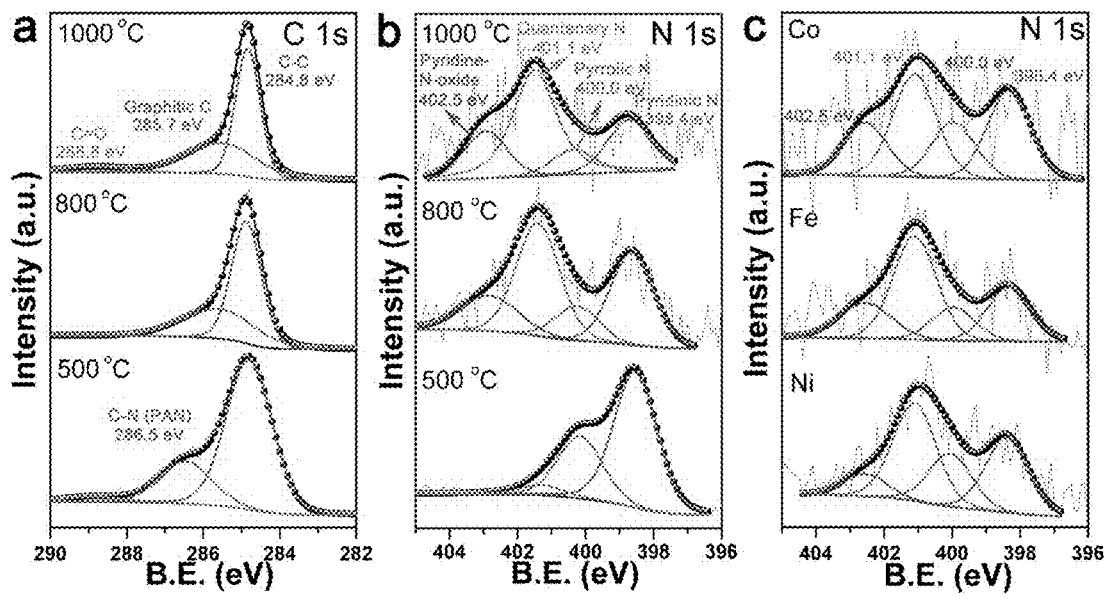
FIGS. 5(a)-5(c) are high-resolution XPS spectra of (a) C 1s and (b) N 1s of PAN-Co annealed at 500, 800 and 1000° C. under 5% $H_2$/95% $N_2$ for 3 h. (c) N 1s of PAN-Co, PAN-Fe and PAN-Ni annealed at 800° C. under 5% $H_2$/95% $N_2$ for 3 h.
Figures 14A, 14B:
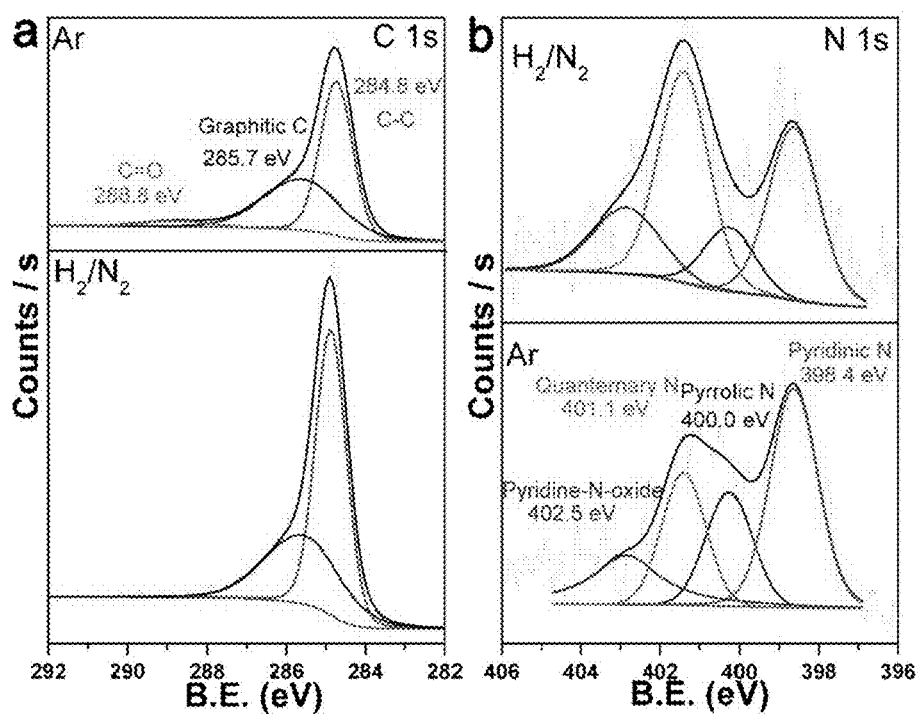
FIGS. 14(a)-14(b) illustrate high-resolution XPS spectra of (a) C 1s and (b) N 1s of PAN-Co annealed at 800° C. under Ar or 5% $H_2$/95% $N_2$ for 3 h.

In order to further investigate the cobalt-catalyzed graphitization of PAN fibers, XPS spectra of Co@N-GCFs annealed at different temperatures (500, 800 and 1000° C.) were obtained. The C 1s spectrum of Co@GCFs obtained at 500° C. (FIG. 5(a)) shows two peaks at 286.5 and 284.8 eV, which correspond to the C—N and C—C functional groups, respectively. Notably, a characteristic C 1s peak located at 285.7 eV arises when the annealing temperature increases to 800° C., which is ascribed to the graphitic carbon formed at this stage. These graphitic carbon structures are preserved at 1000° C., as well as the appearance of C═O (288.8 eV). XPS analysis of high resolution N1s spectra of specimens annealed at different temperatures (FIG. 5(b)) revealed modifications of the chemical structure. At 500° C., most of the nitrogen-based species are either pyridinic and pyrrolic (398.4 and 400.0 eV) with a small amount of quaternary (i.e., graphitic) N (401.1 eV). These are remnants of the nitrile groups in PAN after cyclization. The ratio of quaternary N to other forms increases dramatically with increasing annealing temperature (from aromatization), along with the appearance of pyridine-N-oxide (402.5 eV), which is reported to have the highest ORR activity with pyridinic N. Moreover, the coexistence and similar ratios of the four types of nitrogen contained in all three M@N-GCFs (i.e., M=Co, Fe, Ni, FIG. 5(c)) as well as under different annealing atmospheres (5% $H_2$/95% $N_2$ or Ar, FIGS. 14(a)-14(b)) indicate the potential for using embedded transition metal ions (used to form metal nanoparticles) to ultimately catalyze the graphitization of PAN while controlling the transformation of nitrogen species.

Figures 6A, 6B, 6C, 6D, 6E, 6F:
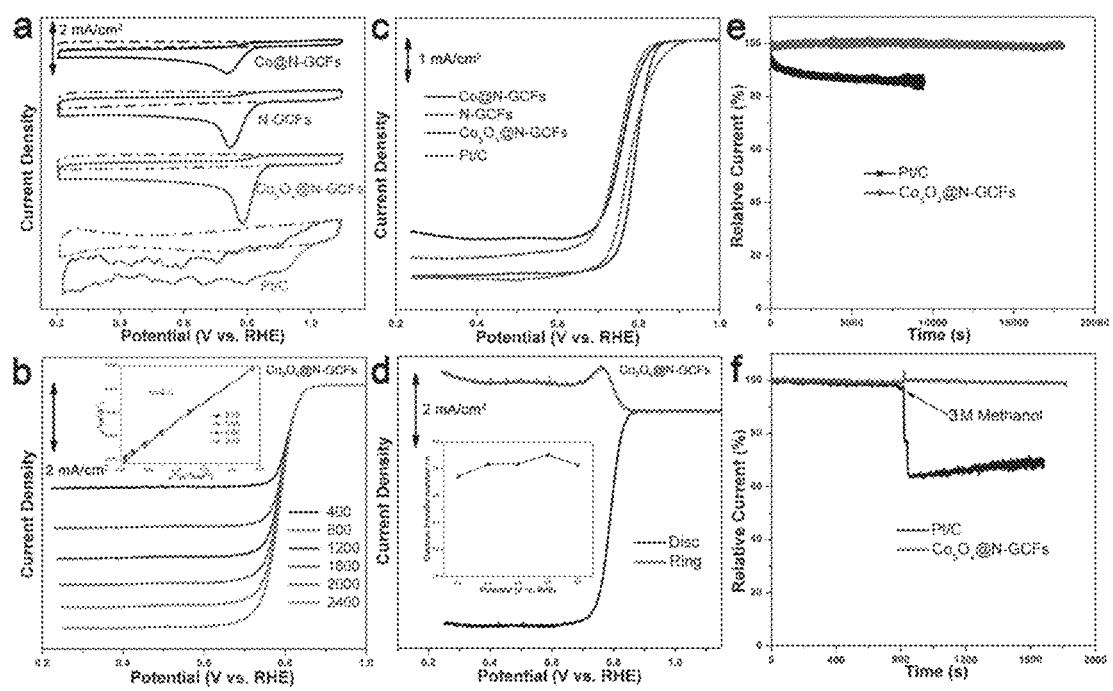
FIGS. 6(a)-6(f) are (a) CV curves of Co@N-GCFs, N-GCFs, $Co_3O_4$@N-GCFs and Pt/C on glass carbon electrodes in $O_2$-saturated or Ar-saturated 0.1 M KOH solution. (b) LSV on RDE of $Co_3O_4$@N-GCFs at different rotation rates of 400, 800, 1200, 1600, 2000 and 2400 rpm. Inset: corresponding Koutecky-Levich plots ($j^{-1}$ versus $\omega^{-0.5}$) at different potentials. (c) LSV on RDE of Co@N-GCFs, N-GCFs, $Co_3O_4$@N-GCFs and Pt/C in $O_2$-saturated 0.1 M KOH solution with a sweep rate of 5 mV/s. The rotation rate of RDE is 1600 rpm. (d) RRDE voltammograms of $Co_3O_4$@N-GCFs in the $O_2$-saturated 0.1 M KOH solution with a sweep rate of 5 mV/s and a rotating rate of 1600 rpm, and the ring potential is kept constant at 0.5 V versus Ag/AgCl. The inset shows the calculated electron transfer number at different potentials. (e) Normalized i-t chronoamperometric responses of $Co_3O_4$@N-GCFs and Pt/C at 0.7 V versus RHE in $O_2$-saturated 0.1 M KOH solution at a rotating rate of 1000 rpm. (f) i-t chronoamperometric responses of $Co_3O_4$@N-GCFs and Pt/C at 0.7 V versus RHE in $O_2$-saturated 0.1 M KOH solution. The arrows indicate the point at which 3.0 M methanol is added into the $O_2$-saturated 0.1 M KOH solution (at 800 s).
Figures 7A, 7B, 7C:
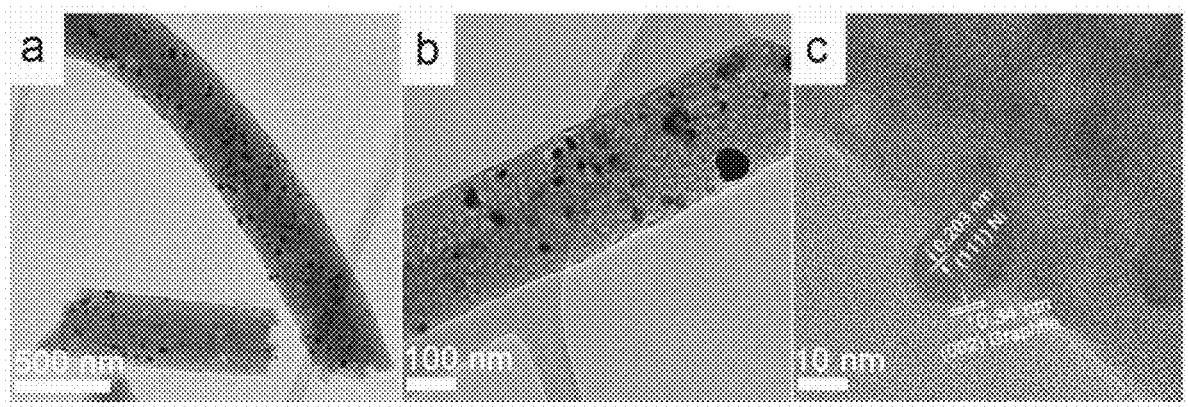
FIGS. 7(a)-7(c) are TEM and HRTEM images of Ni@N-GCFs.
Figures 8A, 8B, 8C:
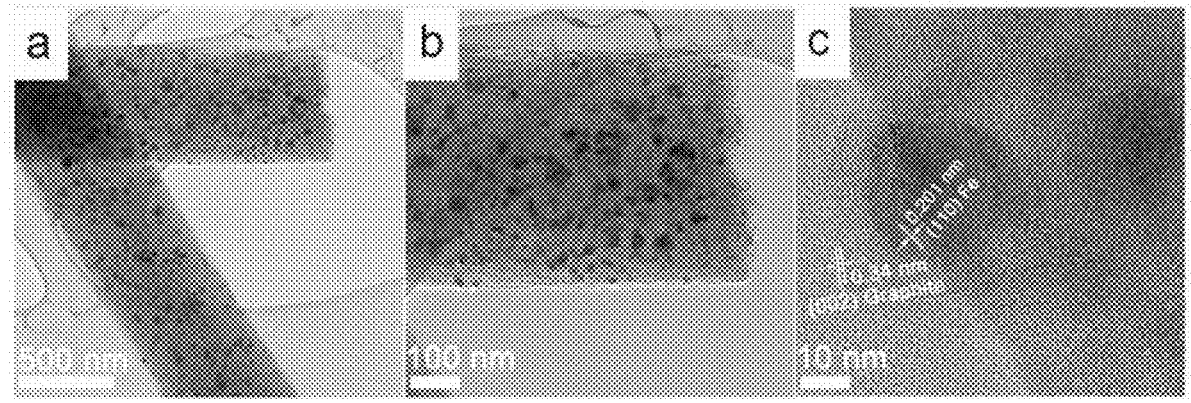
FIGS. 8(a)-8(c) are TEM and HRTEM images of Fe@N-GCFs.
Figures 9A, 9B, 9C, 9D, 9E, 9F:
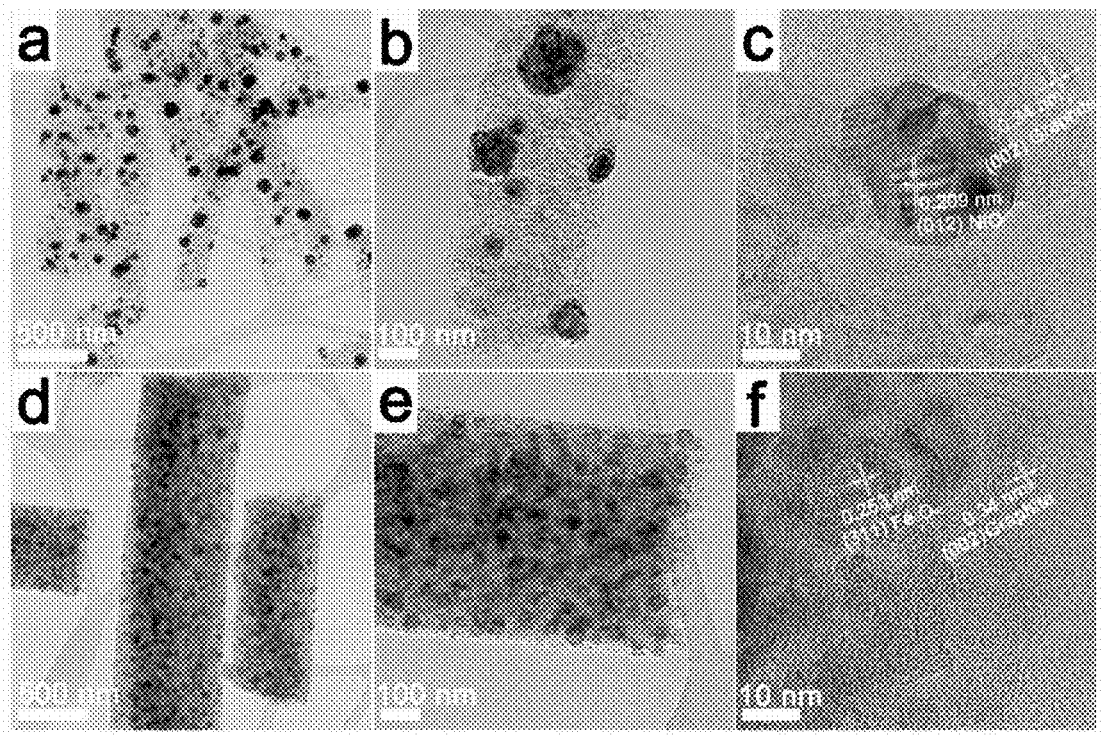
FIGS. 9(a)-9(f) are TEM and HRTEM images of NiO@N-GCFs (a-c) and FeO@N-GCFs (d-f).
Figures 10A, 10B:
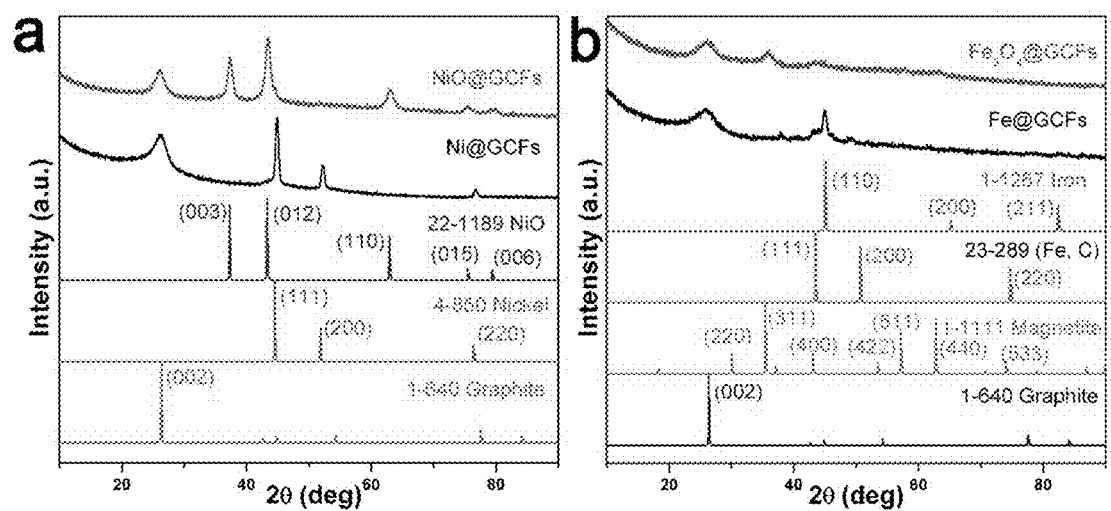
FIGS. 10(a)-10(b) are XRD spectra of (a) Ni@GCFs and NiO@GCFs; (b) Fe@GCFs and $FeO_x$@GCFs.
Figure 15:
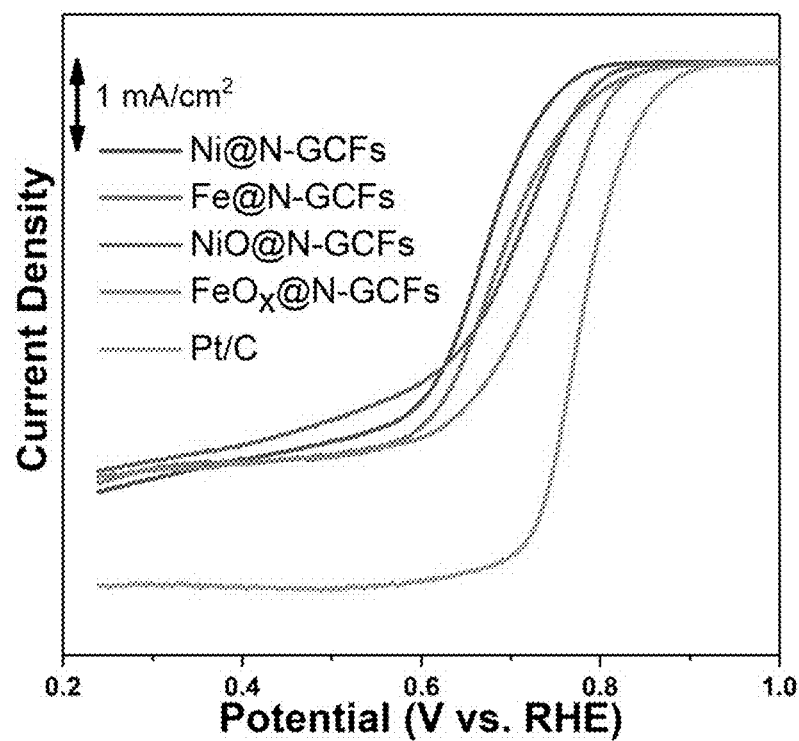
FIG. 15 illustrates LSV on RDE of Ni@N-GCFs, Fe@N-GCFs, NiO@N-GCFs, $FeO_x$@N-GCFs and Pt/C in $O_2$-saturated 0.1 M KOH solution with a sweep rate of 5 mV/s. The rotation rate of RDE is 1600 rpm.

The electrocatalytic activity of $M/MO_x$@N-GCFs for ORR was evaluated by cyclic voltammetry (CV) and rotating disk electrode (RDE) experiments carried out in a 0.1 M KOH aqueous solution saturated with either Ar or $O_2$ gas at room temperature. Both Co@N-GCFs and $Co_3O_4$@N-GCFs were selected to examine their synergistic effect on improving ORR performance. As shown in FIG. 6(a), well-defined $O_2$ reduction peaks of Co@N-GCFs, $Co_3O_4$@N-GCFs, N-GCFs and Pt/C emerge as the electrolyte solution is saturated with $O_2$ (the solid curves in FIG. 6(a)), confirming their ORR activity. Moreover, the cathodic current density and centered potential of the $O_2$ reduction peak for $Co_3O_4$@N-GCFs (0.785 V vs. RHE) is higher than that of Co@N-GCFs (0.736 V) and N-GCFs (0.748 V), which is also very close to the value of 0.80 V for commercial Pt/C catalysts. The unexpected, high ORR activity likely arises from the synergistic chemical coupling effect of $Co_3O_4$ and graphene structures that is further enhanced by nitrogen-doping of graphitic carbon, both of which alone have poor catalytic activity. The impressive electrocatalytic activity of $Co_3O_4$@N-GCFs is also confirmed by recording the polarization curves on a rotating disk electrode at different rotation rates (RDE; FIG. 6(b)). The electron-transfer number, which is an important parameter that characterizes the ORR activity, was calculated at ~4.0 between 0.7 and 0.55 V from the slopes of the Koutecky-Levich plots, which is similar to high efficiency commercial Pt/C. It also indicates the ORR at the $Co_3O_4$@N-GCFs electrodes proceeds by an approximate four-electron reduction pathway. Moreover, by comparison of LSV (linear sweep voltammetry) curves at 1600 rpm, the onset potential (determined for J=−0.1 mA cm$^{-2}$) of $Co_3O_4$@N-GCFs reaches 0.9 V, which is more positive than that of Co@N-GCFs and N-GCFs. The half-wave potential is 45 mV more positive than that of Co@N-GCFs and N-GCFs and even 10 mV more than Pt/C, amongst the best ORR performance of reported Co-based non-precious catalysts. Moreover, a higher limit current density was obtained by $Co_3O_4$@N-GCFs, indicating its higher catalytic activity. In addition, LSV comparisons were made for Ni-, Fe and Co-based composite fibers (FIG. 15) to demonstrate the superior behavior of Co species towards ORR, which enhanced performance can be primarily due to the advanced electronic states and synergistic coupling of Co with the few-layer graphene structures.

The rotating ring-disk electrode (RRDE) measurements were also carried out to monitor the formation of intermediate products like peroxide species ($HO_2^-$) during the ORR process. The current collected at the ring electrode, which corresponds to the amount of $HO_2$ present, is much smaller than that on the disk current for $Co_3O_4$@N-GCFs (FIG. 6(d)). The electron transfer number estimated from the ring and disk currents is 3.8~3.9, which is consistent with Koutecky-Levich analyses.

Figure 16:
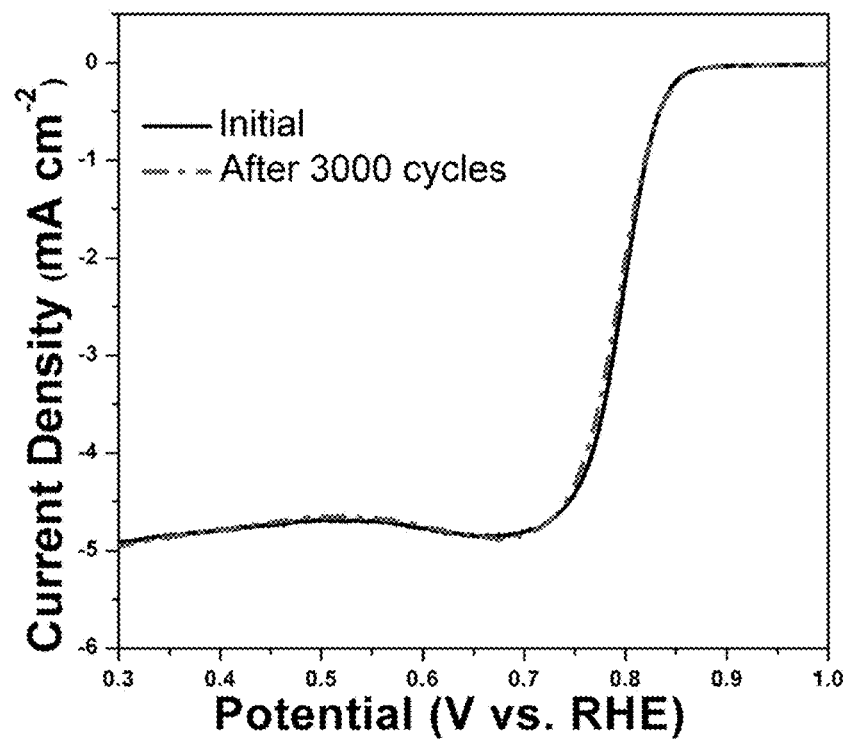
FIG. 16 illustrates LSV on RDE of $Co_3O_4$@N-GCFs in $O_2$-saturated 0.1 M KOH solution with a sweep rate of 5 mV/s before and after ADT.

In addition to the high catalytic activity, $Co_3O_4$@N-GCFs also exhibited remarkable stability for ORR catalysis. Chronoamperometric measurements at a higher voltage of 0.7 V recorded a more than 95% relative current retention after ~20,000s of continuous operation. In comparison, Pt/C showed obvious activity decay of 15% after only ~10,000 seconds. The ORR stability was further evaluated via accelerated durability tests (ADT). $Co_3O_4$@N-GCFs retained the original high activity after 3,000 cycles without obvious shift in the polarization curves (FIG. 16).

In accordance with an exemplary embodiment, it can also be critical that catalysts be robust in a real application environment. Specifically, for example, ORR catalysts must demonstrate a tolerance to contaminant poisoning (e.g., methanol) during electrochemical operation. As Pt is known to be vulnerable to methanol poisoning, an immediate response in the chronoamperometric curve is observed for Pt/C in $O_2$-saturated KOH solution with 3.0 M methanol, while no noticeable change for $Co_3O_4$@N-GCFs is discerned under the same conditions, suggesting better tolerance to methanol poisoning.

By electrospinning PAN fibers containing transition metals (Co, Ni and Fe) ions, a general and effective strategy is disclosed for the feasible design and construction of 3D framework architectures based on the integration of 0D transition metal NPs, 1D N-doped CFs and 3D graphene onion rings. The optimized 3D nanostructure exhibits superior electrocatalytic activity and stability for ORR. The remarkable electrochemical properties are mainly attributed to the synergistic effects obtained from the engineering of $Co_3O_4$ with exposed active sites and the 3D hierarchical porous structure, which consists of numerous graphene onion rings and N-doped CFs. Although there is debate whether planar pyridinic N with a lone electron pair or graphitic N is a better active configuration that improves electron-donating capability and weakens the O—O bond, the coexistence of pyridinic and graphitic N are responsible for the high ORR activity of N-doped graphitic carbon fibers. This work demonstrates an integrated synthesis concept for developing superior catalysts for electrochemical energy devices and may be translated to other applications, including photocatalysis.

Experimental Section

Materials: All of the chemical reagents were used as received. Cobalt (II) acetate tetrahydrate (98%), Nickel (II) acetate tetrahydrate (98%), Iron (III) acetylacetonate (97%), polyacrylonitrile (PAN, MW 130,000), N, N-dimethylformamide (DMF, 99%) were all purchased from Sigma Aldrich. Iron chloride ($FeCl_3$), hydrochloride solutions (35~37%) were obtained from Acros Organics. Nafion solution (5 wt %, Dupont D520) and Pt/C (20 wt %, JM) were supplied without purification. Compressed Air, 5% $H_2$/95% $N_2$ and Air with a purity of 99.99% were supplied by Airgas.
Fabrication of Metal/Metal Oxides@N-GCFs:

In accordance with an exemplary procedure, 1.2 g of PAN powder and either 0.25 g $Co(OAc)_2 \cdot 4H_2O$, 0.355 g $Fe(acac)_3$ or 0.25 g $Ni(OAc)_2 \cdot 4H_2O$ were first dispersed into 8.8 g DMF solution followed by vigorous stirring for 6 h at 80° C. with subsequent stirring for an additional 12 h at room temperature. The homogeneous precursor solution was then transferred into a 10 mL plastic syringe equipped with a stainless steel tip of 0.51 mm inner diameter and electrospun using an eS-robot Electrospinning/spray system (NanoNC). A syringe pump was used to keep a constant flow rate of 1.0 ml/min. A voltage of 15 kV (10 kV, −5 kV), generated by a power supply (Hi-2000, Korea Electric Testing Institute), was applied between the needle and the rolling aluminum foil collector (~1,500 rpm) at a distance of 20 cm. The electrospinning process was performed at room temperature for 1-2 h. As-spun composite fibers were matured and dried in air for at least 24 h at room temperature before further processing and characterization.

In accordance with an exemplary procedure, 1.2 g of PAN powder and either 0.25 g $Co(OAc)_2 \cdot 4H_2O$, 0.355 g $Fe(acac)_3$ or 0.25 g $Ni(OAc)_2 \cdot 4H_2O$ were first dispersed into 8.8 g DMF solution followed by vigorous stirring for 6 h at 80° C. with subsequent stirring for an additional 12 h at room temperature. The homogeneous precursor solution was then transferred into a pipette. 0.5 mL of the homogeneous precursor solution was dripped onto a silicon wafer (but can be any template with a thermal stability up to 1000° C.) that is mounted on a spin coater (ChemMat). The spin coater was spun at 500 rpm for 5 seconds to uniformly disperse the film and then to 3000 rpm for 30-60 seconds to yield a thin film of composite material. As-spun composite films were matured and dried in air for at least 24 h at room temperature before further processing and characterization.

The matured fibers were first stabilized in a tube furnace (Thermo-Fisher) through oxidation at 250° C. in air for 4 h with a heating rate of 2° C./min. Immediately following oxidation, the gas was switched to 5% $H_2$/95% $N_2$ and the temperature was increased to 800° C. at a rate of 5° C/min and held for 3 h. The resulting structures (i.e., metal nanoparticles@N-GCFs were annealed in air with different parameters depending on which metal was used (320° C. for 1 h for Co@N-GCFs; 360° C. for 3 h for either Ni or Fe@N-GCFs) to induce the oxidation of metal nanoparticles to form metal oxides@N-GCFs. N-GCFs were obtained by acid leaching of metal nanoparticles@N-GCFs with 1 M $FeCl_3$ in 0.5 M HCl solution at room temperature for at least 12 h, followed by washing in DI water and drying in a vacuum dry box at 80° C. overnight.
Material Characterization:

Phase identification was determined by X-ray powder diffraction (XRD, PANalytical Empyrean Series 2) using Cu Kα radiation. Scanning electron microscopy (SEM) imaging (FEI Nova NanoSEM NNS450) was used to characterize the morphology of the composites before and after annealing. Fibrous samples were dispersed in ethanol by ultrasonication, drop cast on clean silicon wafers, and then mounted with conductive adhesive on aluminum pin studs (Ted Pella, Redding, CA). The samples were then sputter coated with Pt/Pd (Cressington 108 Auto) for 15 seconds. Morphological features and crystallinity of specimens were observed using transmission electron microscopy (TEM, Titan Themis-300 kV, FEI) bright field imaging. TEM specimens were prepared by dispersing fibrous samples in DI water, sonicating for 30 minutes, and subsequently depositing them onto ultrathin carbon films on holey carbon supports with a 400 mesh copper grid (Ted Pella, Redding, CA). Thermogravimetric Analysis (TGA) was performed using the oxidation-annealing procedure mentioned previously (NETZSCH STA 449 F3 Jupiter). Raman spectra were recorded with Horiba LabRam/AIST-NT with a research grade Leica DMLM microscope (532 nm laser with power of 60 mW). X-ray photon spectroscopy (XPS) analysis was performed using a Kratos analytical AXIS Ultra Delay-Line Detector (DLD) Imaging XPS, which includes wide scans and detailed analysis of specific elements with binding energy resolution of approximately 0.4 eV using a monochromatized X-ray source.
Electrochemical Measurements:

Electrochemical testing was performed in a three-electrode system, with a rotating disc as the working electrode, saturated calomel electrode (SCE) as the reference electrode, and Pt wire as the counter electrode, in an $O_2$-saturated 0.1 M KOH solution under room temperature. Catalyst ink was prepared by dispersing samples in a solution mixture of DI water and isopropanol (1:1 volume ratio). The concentration of the ink is 5 mg/mL (based on the active material). Nafion solution (Sigma-Aldrich) was added as the binder with a mass ratio of 10% (based on the active material). Then 8 μL of the ink was deposited on a pre-polished glassy carbon rotating disk electrode with a diameter of 5 mm with a catalyst loading of 0.2 mg/cm$^2$. The commercial 20% Pt/C catalyst was prepared using the same method with a mass loading of 0.17 mg/cm$^2$. The potential of SCE reference is 1.007 V versus RHE in 0.1 M KOH calibrated by purging pure $H_2$ gas on a Pt wire, where RHE represents the thermodynamic potential of HER/HOR redox reaction under specific experimental conditions. In the condition of normal gas pressure and room temperature, the relationship between RHE and pH value is E (RHE)=0-pH*0.059 V. The CV and LSV curves were obtained through cycling scans from positive to negative at the ambient temperature after purging Ar or $O_2$ for 15 min.

Both rotating disk electrode (RDE) and rotating ring-disk electrode (RRDE) measurements were performed with Pine potentiostats (Model: AFMSRCE). RDE measurements were carried out in the oxygen-saturated 0.1 M KOH solution at rotating rates varying from 400 rpm to 2,400 rpm and with a scan rate of 5 mV/s. LSV on RDE was performed at the RDE of 5 mm in diameter. Koutecky-Levich plots ($J^{-1}$ vs. $\omega^{-1/2}$) in the insert of FIG. 6(b) were analyzed at various electrode potentials. The slopes of their best linear fit lines were used to calculate the electron transfer number (n) on the basis of the Koutecky-Levich equation:

$$1/J = 1/J_L + 1/J_K = 1/B\omega^{0.5} + 1/J_K \quad (1)$$

$$B = 0.20 nFC_o D_o^{2/3} v^{-1/6}; \quad J_K = nFkC_o \quad (2)$$

where J was the measured current density, $J_K$ and $J_L$ were the kinetic- and diffusion-limiting current densities, $\omega$ was the angular velocity, n was the transferred electron number, F was the Faraday constant, $C_o$ was the bulk concentration of $O_2$, v was the kinematic viscosity of the electrolyte, and k was the electron-transfer rate constant.

Another efficient method to estimate the electron transfer number (n) was the rotating ring-disk electrode (RRDE) technique, in which the peroxide species produced at the disk electrode were detected by the ring electrode and n was calculated from the ratio of the ring current ($I_r$) and the disk current ($I_d$) following the equation given below:

$$n = 4I_d/(I_d + I_r/N) \quad (3)$$

where N was the collection efficiency (0.37) of the ring electrode.

In accordance with an exemplary embodiment, the long-term cycling and methanol tolerance test was performed by CV scanning between 0.6 and 1 V vs. RHE at the rate of 400 mV/s.

In addition, porous carbon-based micro-/nanostructures are of great interest for lithium-ion batteries due to their large surface area, short transport path length and excellent buffering capability. However, most of carbon-based anode materials suffer from relatively low capacity due to the lack of superior electrical conductivity, mechanical flexibility and high electrochemical stability. Here, a facial method of developing porous transition metal oxides@N-doped graphitic carbon fibers (GCFs) by sequential electrospinning-carbonization-oxidation process is disclosed. The N-doped carbon fibers has a unique macroscopic hierarchical structure of few-layer graphene onions and a high specific surface area of 390.0 m² and exhibits outstanding mechanical and electrical characteristics. When tested as anode materials for LIBs, NiO@GCFs and $Co_3O_4$@GCFs both exhibited high specific capacity and excellent cycling stability. The superior performance of metal oxides@GCFs in LIBs originates from the synergistic effects of porous graphitic carbon microstructures and neighboring metal oxides, which guarantees abundant lithium-storage sites, fast lithium diffusion, and sufficient void space to buffer the volume expansion. It can be expected that the porous GCFs-based anode materials as disclosed herein will open a new avenue for the development of the next generation of LIBs with a higher specific capacity and better cycling performance.

Porous carbon-based materials are promising candidates as LIBs anode materials because of their large surface areas and abundant structure defects to store more lithium ions, resulting in larger specific capacity. However, they still suffer from poor electrical conductivity and low coulombic efficiency (<50%) due to the irreversible lithium loss during the intercalation/de-intercalation process. $Sp^2$-based carbon allotropes, such as 0-dimensional (0D) fullerenes (C60), one-dimensional (1D) carbon nanotubes (CNTs), two-dimensional (2D) graphene and three-dimensional (3D) graphite, have good crystallinity and excellent electrical conductivity, and can react with lithium ions following an intercalation/de-intercalation process, facilitating its application as an anode electrode for lithium ion batteries (LIBs). However, the slow chemical diffusion of lithium ions along the well-aligned graphene sheets still limit their specific capacity and poor rate capability. Therefore, it remains a great challenge to develop high electrical conductivity and large specific surface area few-layer carbon nanostructures for applications in LIB anodes.

To address these problems, the marriage and integration of the advantages of carbon nanostructures with different dimensions are consider as a promising solution to explore novel freestanding, binder-free anodes for applications in LIBs. The 3D nanoarchitectures with hierarchical meso- and/or macro-porosity and adequate storage sites can improve the kinetics of the lithium storage process for achieving highly efficient anode materials for LIBs. However, achieving 3D hierarchical carbon/transition metal oxide-based architectures with an adequate amount of lithium storage sites has received very limited attention. In accordance with an exemplary embodiment, transition metal oxides (NiO, $Co_3O_4$, etc.)@N-doped 1D graphitic carbon fibers (GCFs) consisted of numerous graphene onions with few-layer graphene sheets for boosting the lithium storage capability are disclosed. The interesting part of synthesis presented here is that the transition metal nanoparticles are in-situ formed during the heat treatment of electrospun polymer fibers with metal salts under inert atmospheres and used as catalysts to induce the graphitization of neighboring polymeric carbon to form graphene nano-onions as building blocks of 1D porous graphitic carbon fibers. Further heat treatment of resulted M@GCFs in $O_2$-abundant atmosphere leads to its oxidation to form (NiO, $Co_3O_4$, etc.)@N-doped 1D graphitic carbon fibers. The MO@N-doped GCFs exhibit greatly improved specific capacitance and remarkable cycling stability, benefited from its large specific surface area, and outstanding mechanical and electrical stability. This facile strategy for the marriage and integration of 1D CNFs, 2D graphene layers and 3D graphene onions or transition metal oxides provides new prospects in the development of highly efficient multifunctional nanomaterials for electrochemical energy storage devices.

Experimental Section

Materials. All of the chemical reagents were used as received. Nickel (II) acetate tetrahydrate (98%), Cobalt (II) acetate tetrahydrate (98%), Polyacrylonitrile (PAN, MW ~130, 000), N, N-dimethylformide (DMF) were all purchased from Sigma Aldrich and used without further purification. Compressed Air (99.99%), 5% Hydrogen in Nitrogen (5% $H_2$, 95% $N_2$) were supplied by warehouse in Campus.

Fabrication of Metal/Metal Oxides@N-GCFs
Electrospinning of Polymer Fibers with Metal Precursors.

In accordance with an exemplary embodiment, 1.2 g PAN powders and 0.25 g $Ni(Ac)_2 \cdot 4H_2O$ or 0.25 g $Co(Ac)_2 \cdot 4H_2O$ were first dispersed into 8.8 g DMF solvent followed by vigorous stirring for 6 h at 80° C. and then stirring for another 12 h at room temperature. Then the homogeneous precursor solution was transferred into a 10 mL plastic syringe equipped with a needle of 0.158 cm inner diameter. A syringe pump was used to keep a constant flow rate of 1.0 ml·min$^{-1}$. A voltage of 15 kV (10 kV, −5 kV), generated by a power supply (Hi-2000, Korea Electric Testing Institute), was applied between the needle and the rolling aluminum foil collector (~1500 rpm) at a distance of 20 cm. The electrospinning process was performed on eS-robot Electrospinning/spray system (Nano NC) at room temperature for 1~2 h. The as-electrospun composite nanofibers were matured and dried in air atmosphere for at least 24 h at room temperature before further using and characterization.

Annealing of Electrospun Fibers to Obtain Metal Nanoparticels@N-GCFs.

The matured nanofibers were firstly stabilized by annealing at 250° C. under Air atmosphere for 4 h with a heating rate of 2° C. min$^{-1}$. After that, temperature is increased to 800° C. at a rate of 5° C. min$^{-1}$ and kept for 3 h in a tubular furnace (Thermal Scientific) under 5% $H_2$ in $N_2$ atmosphere.

Further oxidation of as-annealed fibers to obtain metal oxides@N-GCFs. In accordance with an exemplary embodiment, the as-obtained metal nanoparticels@N-GCFs were annealed under air atmosphere at different parameters (360° C. for 3 h for Ni @N-GCFs, 320° C. for 1 h for Co@N-GCFs) to induce the oxidation of metal nanoparticles to form metal oxides@ N-GCFs.

Characterization.

Phase identification was determined by XRD (X-ray powder diffraction) (Phillips X'Pert) using Cu Kα radiation. SEM (scanning electron microscopy) imaging (FEI Nova NanoSEM NNS450) was used to characterize the morphology and particle sizes of the composites before and after thermal annealing. Fibrous samples were dispersed in ethanol by ultrasonication, dip-dropped on clean silicon wafers and then mounted with conductive adhesive on aluminium pin studs (Ted Pella, Redding, CA). The samples were then sputter coated with Pt/Pd for 15 seconds. Morphological features and crystallinity of specimens were observed using TEM (transmission electron microscopy) (Titan Themis-300 kV, FEI) bright field imaging. TEM specimens were prepared by dispersing fibrous samples in DI water, sonicated for 30 minutes, and subsequently deposited onto ultrathin carbon films on holey carbon supports with a 400 mesh copper grid (Ted Pella, Redding, CA). Raman spectra were recorded with Horiba LabRam/AIST-NT AFM with a research grade Leica DMLM microscope (total power was 60 mW). X-ray photon spectroscopy (XPS) analysis was performed by a Kratos analytical AXIS Ultra Delay-Line Detector (DLD) Imaging XPS, which includes wide scans and detailed analysis of specific elements and binding energy resolution can be down to approximately 0.4 eV by using the monochromatized X-ray source. The binding energies obtained in the XPS analysis were corrected with reference to C1s (284.8 eV)

Electrochemical Measurement

The electrochemical behavior of the prepared metal oxides@ N-GCFs samples was carried out using CR2032 coin type cells with lithium metal as the counter and reference electrodes at room temperature. The electrolyte was 1 M LiPF$_6$ in a 50:50 w/w mixture of ethylene carbonate and diethyl carbonate. The working electrode was fabricated by compressing a mixture of the active materials, conductive material (carbon black), and binder (polyvinylidene fluoride) in a weight ratio of metal oxides@ N-GCFs/carbon/PVDF=8:1:1 onto a copper foil current collector. The cells were assembled in an argon-filled glove box with the concentrations of moisture and oxygen at below 1 ppm. The electrode capacity was measured by a galvanostatic discharge-charge method between 0.05 and 3.0 V at a current density of 50 mA g$^{-1}$ at a battery test system (Land CT2001A).

Results and Discussion

Figures 17A, 17B, 17C, 17D, 17E, 17F:
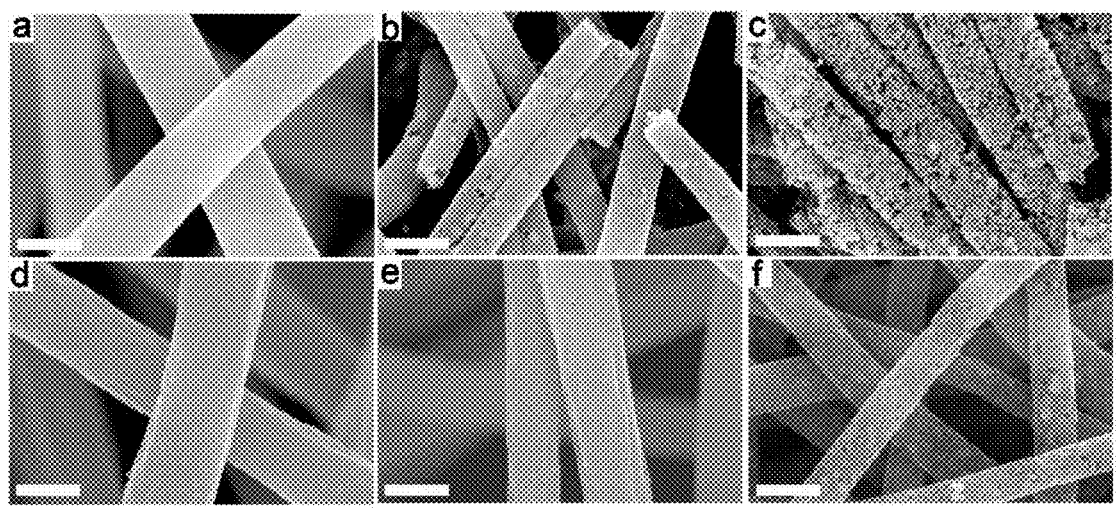
FIGS. 17(a)-17(f) are SEM image of (a) electrospun Ni/PAN, (b) Ni@GCFs, (c) NiO@N-GCFs, (d) electrospun Co/PAN, (e) Co@GCFs and (f) $Co_3O_4$@N-GCFs.

To achieve metal oxides@graphitic carbon fibers for LIBs anode materials, a two-step strategy was firstly used to develop metal@graphitic carbon fibers by electrospinning-annealing process. Taking Ni as an example, Ni(Ac)$_2$ was mixed with polyacrylonitrite (PAN) in DMF to obtain a homogeneous solution with requisite viscosity and electrical conductivity for electrospinning. As-electrospun Ni/PAN nanofibers exhibit a fibrous morphology with a uniform diameter of approximately 634 nm (FIG. 17(a)), whereas Co/PAN exhibit a similar fibrous morphology but larger diameter (~921 nm, FIG. 17(d)), proving the generality of the electrospinning method as disclosed. The difference in fiber diameter lies in the different interaction behavior between transition metal salts and PAN polymer in DMF and resulted viscosity and electrical conductivity of electrospun solution.

Figures 18A, 18B, 18C, 18D, 18E, 18F, 18G, 18H, 18I:
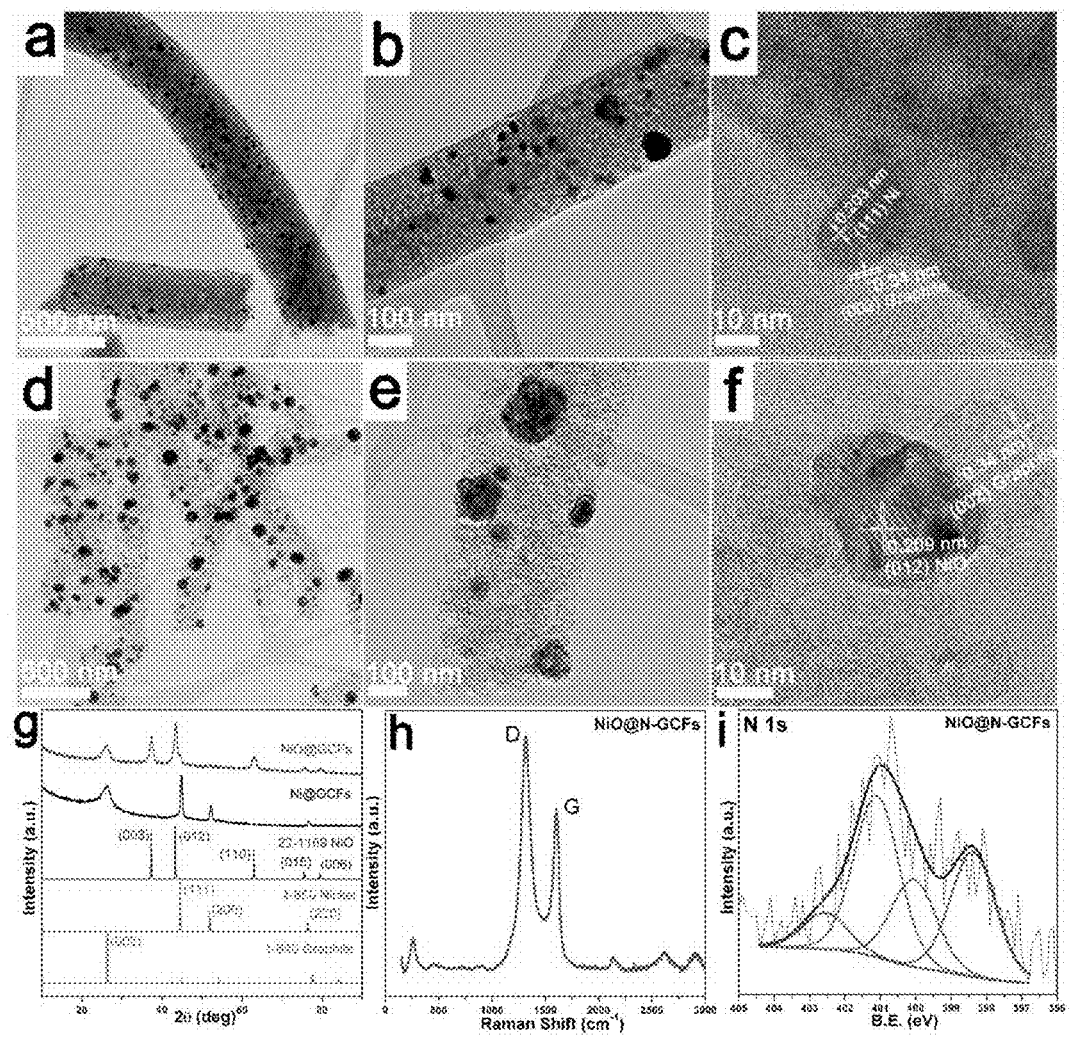
FIGS. 18(a)-18(i) are TEM and HRTEM images of Ni@N-GCFs (a~c), NiO@N-GCFs (d-f); (g) XRD spectra of Ni@GCFs and NiO@GCFs; (h) Raman spectra of NiO@N-GCFs; (i) XPS N 1s spectra of NiO@N-GCFs.

After pre-oxidation, the thermal treatment of metal/PAN nanofibers at 800° C. under an inert atmosphere (e.g., 5% $H_2/N_2$) leads to the formation of metal@GCFs. Taking Ni@GCFs as an example, the Ni ions were firstly in-situ reduced to Ni nanoparticles without apparent aggregation during this annealing process. As observed from FIG. 17(b) and FIGS. 18(a) and 18(b), monodispersed Ni nanoparticles are embedded inside the porous CNFs (carbon nanofibers), where the Ni NPs are in intimate contact with the 1D carbon backbones. High-resolution TEM (FIG. 18(c)) shows that the carbon nanofibers are consisted of numerous graphene onions with a d-spacing of 0.34 nm (graphite (002)) and Ni nanoparticles of ~20 nm with a d-spacing of 0.204 nm (Ni (111)). The resulting Ni nanoparticles with high surface area, which are in close proximity to the polymer (amorphous carbon), play an important role in catalyzing the graphitization of neighboring amorphous carbon into graphitic carbon at a significantly reduced temperature (800° C., normally PAN graphitized at ~2500° C. without the catalysis of metal nanoparticels), which leads to the formation of porous graphitic CNFs nearby. Reversely, the amorphous carbon minimizes the crystal growth of the Ni nanoparticles due to a reduced mass diffusivity of Ni ions. The fullerene-like graphitic walls ranging between approximately 10 graphene layers and 40 graphene layers, can not only hold the catalytic Ni NPs but also improve the electrical conductivity of the carbon matrix, which is vital for the electrochemical lithium storage process.

Figures 20A, 20B, 20C, 20D, 20E, 20F, 20G, 20H, 20I:
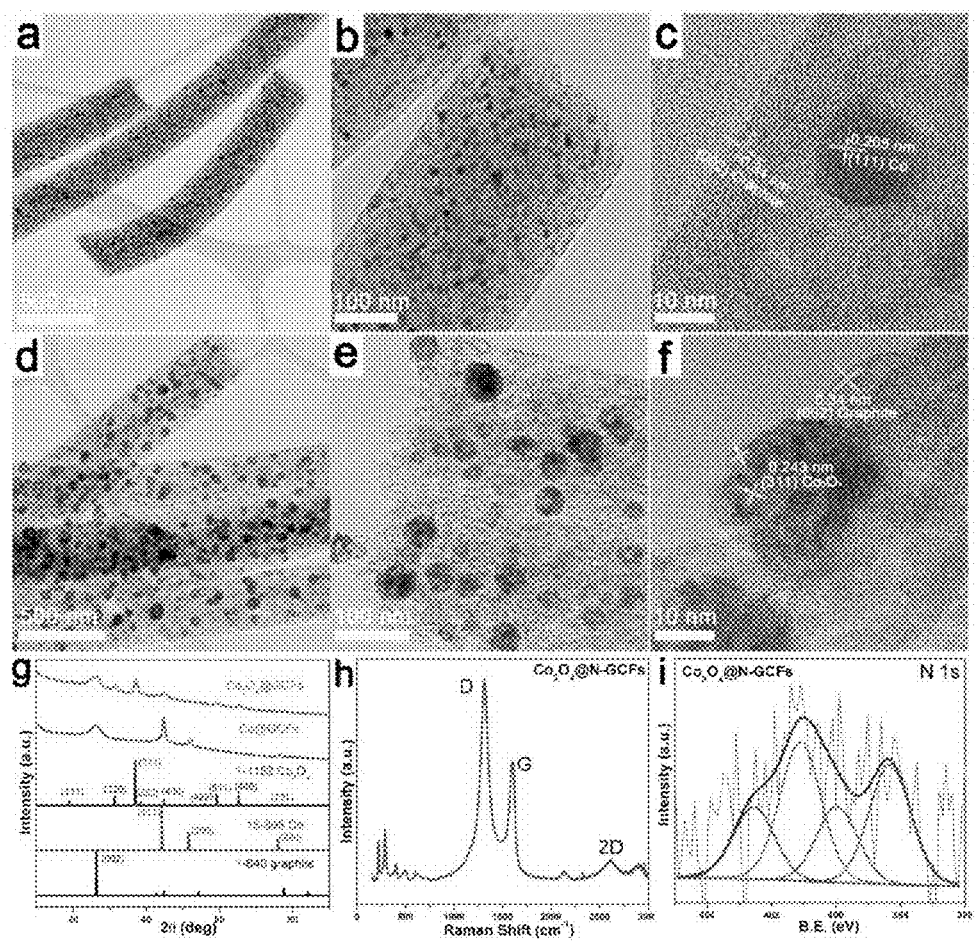
FIGS. 20(a)-20(i) are TEM and HRTEM images of Co@N-GCFs (a~c), $Co_3O_4$@N-GCFs (d-f); (g) XRD spectra of Co@GCFs and $Co_3O_4$@GCFs; (h) Raman spectra of $Co_3O_4$@GCFs; (i) XPS N 1s spectra of $Co_3O_4$@GCFs.

The resulted Ni@GNFs was further oxidized by annealing in air to obtain NiO encapsulated in graphitic carbon nanofibers. As seen from FIG. 17(c), the porosity of carbon fibers improved a lot after oxidation and graphene onion structures are clearly visible, which is probably because some amorphous/polymeric carbon was further combusted at this stage, improving the overall conductivity and porosity. TEM and HRTEM (FIGS. 18(d)-18(f)) further confirm the improvement of porosity and formation of NiO, which can be confirmed from the distinct NiO (012) facets and graphene layers with d-spacing of 3.4 Å. XRD analysis also provide direct proof of the graphitization of carbon nanofibers and the phase transformation of Ni during the sequential annealing-oxidation process. The XRD pattern of the Ni@GNFs prepared at 800° C. exhibits a sharp band at 25.21°, which corresponds to the (002) plane of the graphitic carbon of CNFs (JPCDS card #1-640) catalyzed by embedded Ni NPs (FIG. 18(g)), indicating the high degreed graphitization of carbon nanofibers. A series of other XRD peaks located at 44.82, 51.82 and 76.39 are characteristic of the (111), (200) and (220) planes of Ni nanocrystals (JPCDS card #4-850). Furthermore, after oxidation, NiO@GNFs demonstrate the characteristic XRD peaks of graphite and NiO phases (JPCDS card #22-1189) without other apparent XRD peaks, indicating the well preservation of graphene nanostructures and completed oxidation of Ni nanocrystals to NiO. The graphitic nature of NiO@GCFs can also be illuminated by Raman spectra (FIG. 18(h)), which show a distinct carbon D and G peaks at 1357 and 1580 cm$^{-1}$ and also 2D peaks at 2618 cm$^{-1}$. It's worth to note here, the crystallization of metal salts and simultaneously catalyzing the graphitization of polymeric carbon fibers also happens when incorporating Co salts to form Co$_3$O$_4$@GCFs (FIGS. 20(a)-20(i)), providing a general strategy for constructing LIB-active metal oxides on porous carbon backbones for high-performance LIB anode materials. Moreover, the N-doping of graphitic carbon fibers was studied by XPS spectra (FIG. 18(i)), which shows four kinds of distinct N species, that is, pyridinic N (398.4 eV), pyrrolic N (400.0 eV), quaternary (graphitic) N (401.1 eV) and pyridine-N-oxide (402.5 eV). Moreover, the coexistence and similar ratio of the four types of N content in both kinds of MO$_x$@N-GCFs (M=Ni, Co) (FIG. 20(i)) indicate the feasibility of transition metal nanoparticles on catalyzing the graphitization of PAN and controlling the transformation of N species upon annealing at inner atmosphere, which is all originated from the N-containing PAN molecules. The N-doping of graphitic carbon of MO@N-GCFs can help form abundant defects or vacancies, which can serve as additional lithium storage sites during the operation of LIBs, improving the overall capacitance. Moreover, the integration of various metal oxides and 1D N-doped graphitic carbon fibers was anticipated to take advantages of the structural benefits of both GCFs and 1D carbon networks to provide improved lithium storage sites, greatly facilitated Li$^+$ ions diffusion and transmission, resulting in excellent capacitance and cycling stability.

Figures 19A, 19B, 19C, 19D:
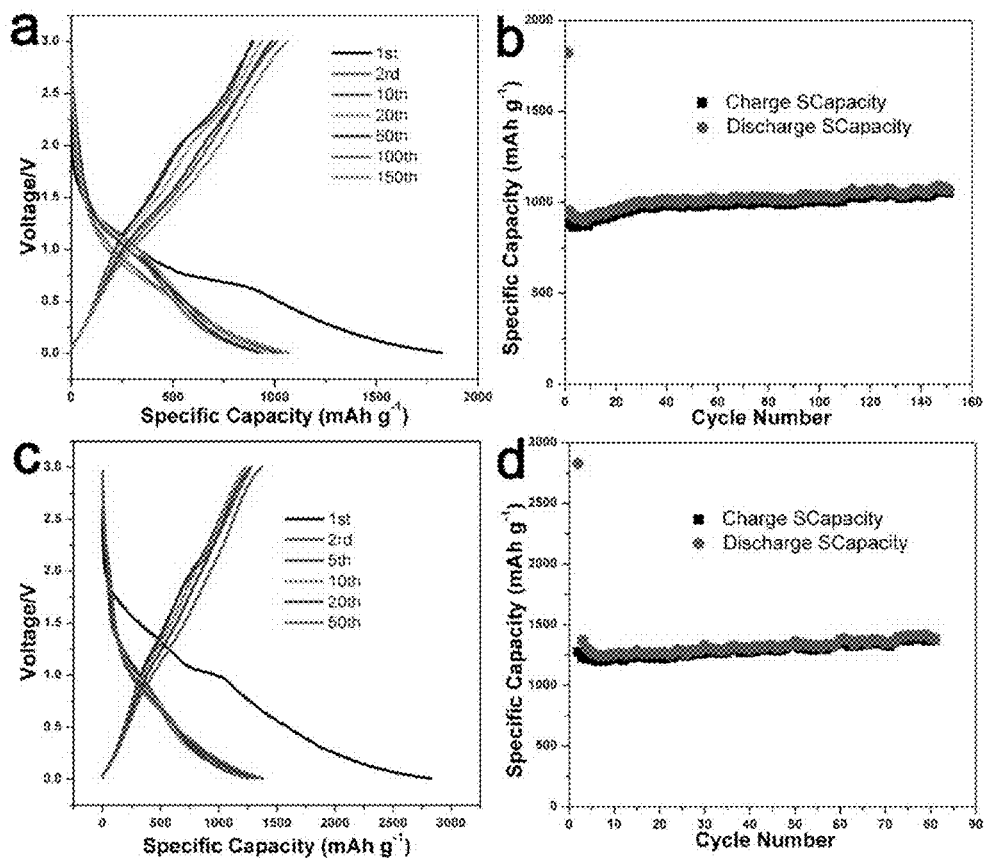
FIGS. 19(a)-19(d) are (a, c) Discharge-charge curves for NiO@N-GCFs and $Co_3O_4$@N-GCFs at a current density of 50 mAg$^{-1}$ between 0.05 and 3.0 V. b) Charge and discharge specific capacity (SCapacity) versus cycle number for NiO@N-GCFs and $Co_3O_4$@N-GCFs at a current density of 50 mAg$^{-1}$.
Figures 21A, 21B:
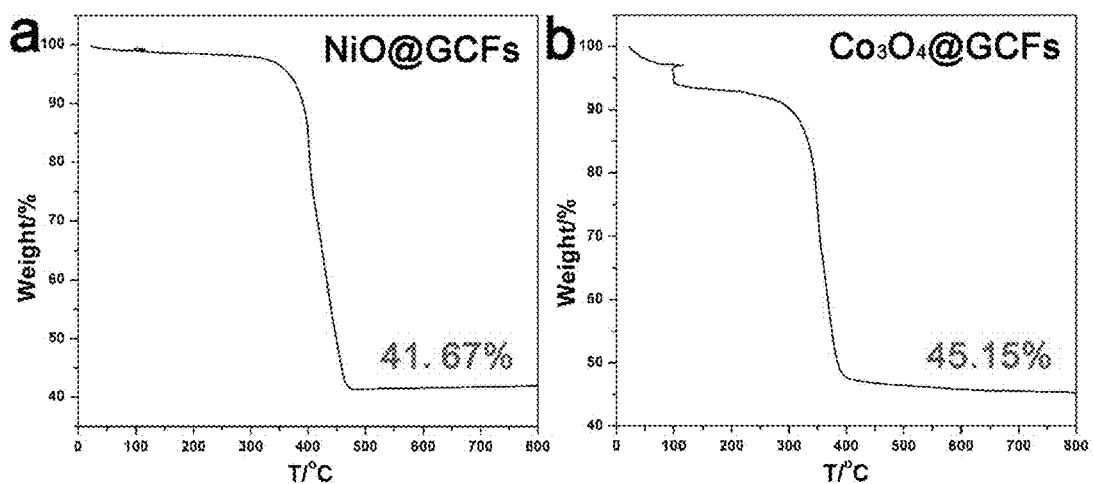
FIGS. 21(a)-21(b) are TGA weight loss curves of NiO@GCFs and $Co_3O_4$@GCFs.

The lithium-storage properties of the prepared metal oxides@N-GCFs as anodes were evaluated with the standard MO@N-GCFs/Li half-cell configuration. In order to precisely quantity the ratio of metal oxides in MO@N-GCFs, TGA (Thermogravimetric analysis, FIGS. 21(a)-21(b)) was conducted, which indicate the ratio of NiO and Co$_3$O$_4$ in MO@N-GCFs as 41.67% and 45.13%, respectively. The specific capacitance is calculated based on the weight of active metal oxides to illuminate the advantages of porous hierarchical structures. FIGS. 19(a) and 19(c) show the first-cycle discharge-charge voltage profiles of NiO@N-GCFs and Co$_3$O$_4$@N-GCFs at a current density of 50 mAg$^{-1}$ in the potential range from 0.05 to 3.0 V. In the first-discharge curves, the potential falls to ~1.0 V without apparent plateau for NiO@N-GCFs and then gradually declines to the cutoff voltage of 0.05 V, in analogy with the behavior of previously reported similar systems. However, for Co$_3$O$_4$@N-GCFs, a clear plateau was observed at ~1.06 V and gradually decrease to 0.05 V. The initial capacity of NiO@N-GCFs and Co$_3$O$_4$@N-GCFs is 1818.5 and 2392.8 mAh g$^{-1}$, which is much higher than the theoretical capacitance of NiO (717.7 mAh g$^{-1}$) and Co$_3$O$_4$ (890.0 mAh g$^{-1}$). The great difference between the initial capacity and theoretical capacitance or first-cycle capacity is usually ascribed to some irreversible reactions, such as the formation of SEI (Solid Electrolyte Interphase) layers, the intercalation of Li$^+$ into graphene layers and so on. The stable specific capacity of NiO@N-GCFs and Co$_3$O$_4$@N-GCFs after 30 cycles (FIGS. 19(b) and 19(d)) at a current density of 50 mAg$^{-1}$ are 1076 and 1328 mAh g$^{-1}$, whereas the theoretical capacitance of NiO and Co$_3$O$_4$ are 717.7 and 890.0 mAh g$^{-1}$. The extra capacity above that offered by the redox reaction may be due to the interfacial lithium-storage mechanism or defect-storage mechanism, which was induced by the numerous interfaces between graphene nanoonions and metal oxides and N-doping resulted from defects formed during the graphitization process of polymeric PAN molecules. Moreover, a stable high capacity of both NiO@N-GCFs and Co$_3$O$_4$@N-GCFs were still well preserved even after consecutive cycling for 150 and 80 cycles, suggesting the breathability of the 1D porous graphitic carbon fibers as disclosed.

The significantly improved electrochemical lithium storage performance of MO@N-GCFs is based on a combination of various parameters. Firstly, the unique graphene-onion structure and increased porosity of carbon fibers leads to an increase in the electrolyte/MO$_x$ contact areas and a decrease in the effective diffusion distance for both lithium ions and electrons. Secondly, the fullerene-like graphene cavities enhance the specific capacity by providing extra space for intercalation and storage of Li$^+$ between graphene layers and improving the cycling performance by buffering against the local volume change during consecutive Li$^+$ insertion/extraction processes. Thirdly, the creation of various interfaces between metal oxides and neighboring graphene onions as long as the N-doping provide extra capacitance contribution for lithium storage, resulting a high capacitance.

In summary, the uniform 1D porous metal oxides@N-GCFs were successfully synthesized in high quality and yield by a sequential electrospinning-annealing-oxidation process. When used as LIBs anode materials, these metal oxides@N-GCFs exhibited ultrahigh specific capacitance and good cycling performance. The superior LIBs performance originated from the porous hollow graphitic carbon fibers with numerous graphene onions and well-engineered interfaces, which guarantees more lithium-storage sites, a shorter lithium-ion diffusion length, and sufficient void space to buffer the volume expansion during consecutive Li$^+$ insertion/extraction processes. Given their facile synthesis and improved performance, it can be expected that this general method for porous GCFs with metal/metal oxides will open a new avenue for the development of the next generation of various electrochemical devices with improved performance.

In addition, recently lakes, swamps and suburban rivers of cities have become glowingly polluted according to various kinds of wastewater contamination. Much call has been made on advanced treatment techniques to where more adsorption operation is employed by granular and powdered activated carbon (AC) for removal of organic substances, color, odor, etc. From application perspectives in adsorption, activated carbon fiber (ACF), with a fibrous shape and well-defined porous structure, is by far one of the most important carbon nanoporous materials to be considered. Herein, the production of one-dimensional (1D) nanoporous graphitic carbon fibers (GCFs) embedded with active photocatalytic O-deficient TiO$_x$ components by a facial electrospinning and annealing process is disclosed. The phase component, surface area and pore structure of carbon fibers are well engineered by controlled electrospinning, acid leaching or oxidation to optimize its photocatalytic and water adsorption capability towards removal of methylene blue (MB). Compared with commercial AC powders and Degussa P25, the nanoporous TiO$_x$@GCFs demonstrated a fast and total 96% removal of MB in less than 5 minutes, which can be ascribed to the synergistic effects of great adsorption capability of the well-engineered 1D porous carbon nanostructures and photocatalytic O-deficient TiO$_x$. Thus, a novel insight into the design of functional porous carbon nanofibers for their application in environmental remediation is disclosed.

Activated carbon fiber (ACF) is thought to be one of the best absorbents in adsorption applications because of its considerable advantages over other commercial storage materials. It is an excellent microporous material with low mesoporosity and most with absence of macroporosity if it is well produced. ACF's characteristics of high packing density and excellent volumetric capacity present its importance and usefulness for adsorption applications. Such ACF are very useful for various applications such as, water purification, filtration, heavy metal removal, photocatalysis, biomedical applications, capacitors, vapor sensing, refrigeration, electrochemical applications, natural gas and biogas storage and so on. ACF is commonly produced from carbon fiber (CF) which is not much different from the methods employed in AC production. The activation process can be described in a simple definition where an additional thermal treatment under oxidizing atmosphere on the CF in temperature range of 700° C. to 1000° C. There are differences in pores structure presented by common AC and ACF. Common AC has a ladder-like structure, adsorbate gas molecules have to pass through macropores first and mesopores for second path before entering micropores. In ACF, micropores can be reached in large amount by adsorbate gas which are directly exposed to the surface of the fibers, so this helps leading in adsorption mechanism. ACF are commercially produced by the pyrolysis of carbonaceous materials of synthetic polymers such as rayon, pitch, saran, polyacrylonitrile (PAN) and phenolic resin followed by an additional activation process.

Electrospinning is a convenient and widely used method to obtain 1D nanostructures in a short time and large scale. By this feasible method along with controlled heat treatment, a variety of polymer, polymer/inorganic and inorganic fibers with controlled pore structures can be readily prepared, which are considered as good candidates in the field for filtration, adsorption or even as photocatalysis due to the special surface features and enhanced functionalities introduced by the loaded particles. Besides the high specific surface area, the carbon nanofibers exhibit outstanding charge transport properties owing to their high aspect ratio character, which enables less interfacial interaction of the travelling electrons at grain boundaries. This feature could also highly promote the efficiency of various photocatalytic or electrochemical devices, such as photocatalytic water purification systems.

In this disclosure, an electrospinning-based method is disclosed, which produced highly porous and conductive one-dimensional graphitic carbon fibrous networks embedded with various metal nanoparticles (Ni, Fe, Co, etc.). The formed metal nanoparticles/nanoclusters when annealing under an inert atmosphere, which have a very high surface area and are in direct contact with the polymers, can catalyze the formation of graphitic (crystalline) carbon at greatly reduced temperatures (~800° C.). By following with acid leaching and Ti incorporation to achieve more porosity and titanium oxide, the nanofiber hybrids demonstrate an interconnected framework with large pore channels, considerable active sites and high specific surface area. Benefited from their structural advantages and the synergistic chemical coupling effects from photocatalytic O-deficient $TiO_x$ and robust 1D well-engineered porous structures, when served as a new photocatalysts for water purification, we found that TiO@GCFs (graphitic carbon fibers) displayed a fast and total 96% removal of MB in less than 5 minutes compared with commercial activated carbon powders and Degussa P25. This facial strategy for the integration of 1D porous carbon fibers, photocatalytic $TiO_x$ would provide new prospects in the development of highly efficient multifunctional carbon-based photocatalysts for their application in environmental remediation and water purifications.

Experimental Section

Materials. All of the chemical reagents were used as received. Nickel (II) acetate tetrahydrate (98%), Polyacrylonitrile (PAN, MW ~130, 000), N, N-dimethylformide (DMF), acetic acid and titanium isopropxides (TIP, 97%) were all purchased from Sigma Aldrich and used without further purification. Iron chloride ($FeCl_3$), Hydrochloride solutions (3537%) were obtained from Acros Organics. Compressed Air, 5% Hydrogen in Nitrogen (5% $H_2$, 95% $N_2$) and Air with a purity of 99.99% are supplied by warehouse in Campus.

Fabrication of $TiO_x$@GCFs

Electrospinning of Polymer Fibers with Metal Precursors.

In accordance with an exemplary procedure, 1.2 g PAN powders and 0.25 g $Ni(Ac)_2 \cdot 4H_2O$ were first dispersed into 8.8 g DMF solvent followed by vigorous stirring for 6 h at 80° C. and then stirring for another 12 h at room temperature. Then the homogeneous precursor solution was transferred into a 10 mL plastic syringe equipped with a needle of 0.158 cm inner diameter. A syringe pump was used to keep a constant flow rate of 1.0 Å voltage of 15 kV (10 kV, −5 kV), generated by a power supply (Hi-2000, Korea Electric Testing Institute), was applied between the needle and the rolling aluminum foil collector (~1500 rpm) at a distance of 20 cm. The electrospinning process (eS-robot Electrospinning/spray system, NanoNC) was performed at room temperature for 1~2 h. The as-electrospun composite nanofibers were matured and dried in air atmosphere for at least 24 h at room temperature before further processing and characterization.

Annealing of Electrospun Fibers to Obtain Metal Nanoparticels@GCFs.

The matured nanofibers were firstly stabilized by annealing at 250° C. under Air atmosphere for 4 h with a heating rate of 2° C. min⁻¹. After that, temperature is increased to 800° C. at a rate of 5° C. mid' and kept for 3 h in a tubular furnace (Thermal Scientific) under 5% $H_2$ in $N_2$ atmosphere.

3. Acid leaching of as-annealed fibers to obtain porous GCFs.

The as-obtained Ni nanoparticels@GCFs were etched by acid solution of 1M $FeCl_3$ and 0.5 M HCl at room temperature for at least 12 h to remove the metal nanoparticles and inactive species, followed by washing in DI water and drying at vacuum dry box at 80° C. overnight.

The Incorporation of $TiO_x$ in Porous GCFs

A desired amount of porous GCFs was first soaked in ethanol/acetic acid (8:2) solution of 1.0 M titanium isopropoxides for 8 h. After washing by ethanol for three times and dry at 80° C. in vacuum oven for 12 h, porous GCFs with Ti precursors were annealed in air at 400° C. for 3 h to induce the crystallization of Ti precursors and its incorporation into carbon fibers networks.

Characterization.

Phase identification was determined by XRD (X-ray powder diffraction) (Phillips X'Pert) using Cu Kα radiation. SEM (scanning electron microscopy) imaging (FEI Nova NanoSEM NNS450) was used to characterize the morphology and particle sizes of the composites before and after thermal annealing. Fibrous samples were dispersed in ethanol by ultrasonication, dip-dropped on clean silicon wafers and then mounted with conductive adhesive on aluminium pin studs (Ted Pella, Redding, CA). The samples were then sputter coated with Pt/Pd for 30 seconds. Morphological features and crystallinity of specimens were observed using TEM (transmission electron microscopy) (Titan Themis-300 kV, FEI) bright field imaging. TEM specimens were prepared by dispersing fibrous samples in DI water, sonicated for 30 minutes, and subsequently deposited onto ultrathin carbon films on holey carbon supports with a 400 mesh copper grid (Ted Pella, Redding, CA). Raman spectra were recorded with Horiba LabRam/AIST-NT AFM with a research grade Leica DMLM microscope (total power was 60 mW).

Photocatalytic Performance Evaluation.

The adsorption and photocatalytic performance of porous GCFs were determined by measuring the degradation of Methylene Blue (MB) in the presence of porous GCFs suspensions under UV illumination. Prior to degradation testing, GCFs suspensions were prepared by dispersing the GCFs powders in filtered deionized water (0.22 Millipore), and sonicating for 5 minutes using a tip-horn ultrasonic processor (Hielscher UP100H, Ringwood, NJ). Any residual organics remaining on the surface of the photocatalytic materials (i.e., from the synthesis process) were removed by irradiating the material for 24 hours prior to testing with UV light (Phillips UV (A) 40 Watt bulb at 1 mW/cm$^2$).

In an exemplary degradation reaction, a glass reactor was filled with 200 mL containing (i) a 250 mg/L GCFs suspension and (ii) 13 μM solution of Methylene Blue (MB) maintained at 25° C. and magnetically stirred at 500 rpm. The photon source was a Phillips UV (A) 40 Watt bulb operated at 1 mW/cm$^2$. At the start of each degradation experiment, MB (under dark conditions) was allowed to mixed with suspended GCFs for one minutes prior to irradiation, followed by direct irradiation with the photon source. At certain intervals, 3 ml of suspensions were taken out and centrifuged to removes GCFs and keep supernatant. The photocatalytic activity was monitored by measuring the absorbance of MB via UV-Visible Spectroscopy (Varian Cary-50) between 300-900 nm.

Figures 22A, 22B, 22C, 22D, 22E, 22F, 22G, 22H, 22I:
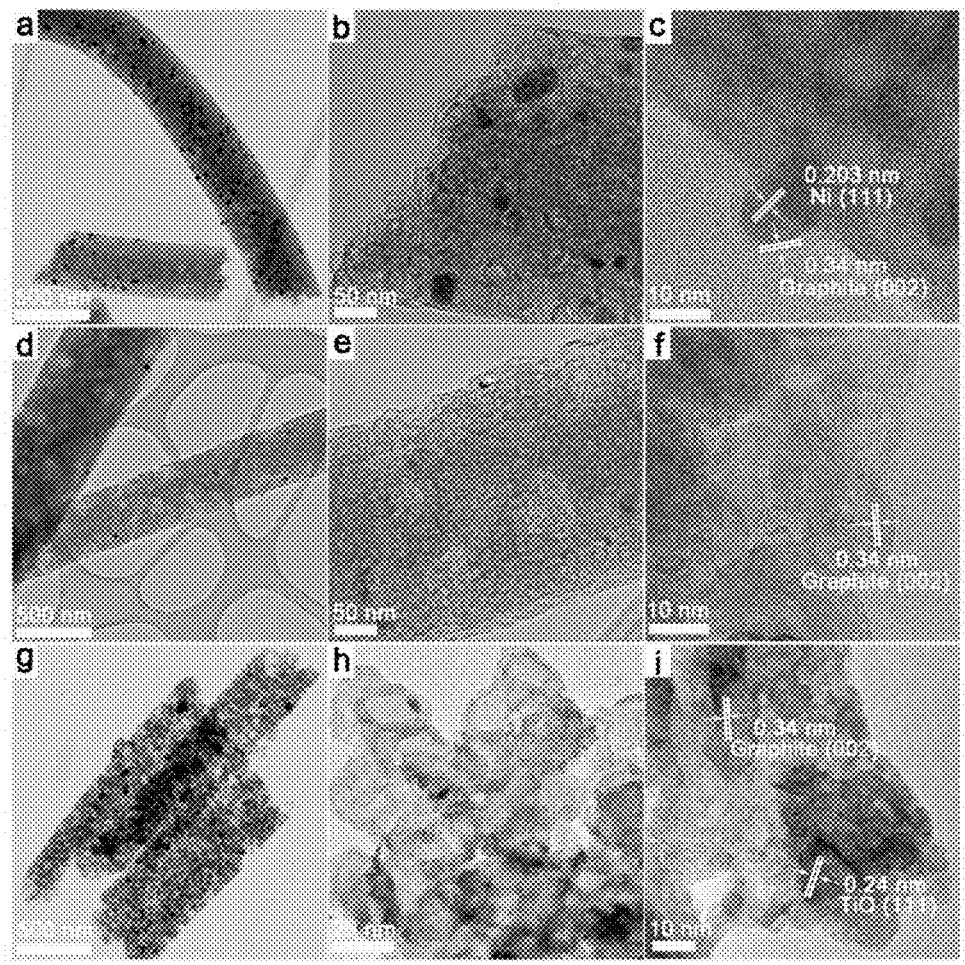
FIGS. 22(a)-22(i) are TEM and HRTEM images of Ni@GCFs (a~c), porous GCFs (d~f) and TiO@ GCFs (g-i).
Figures 23A, 23B:
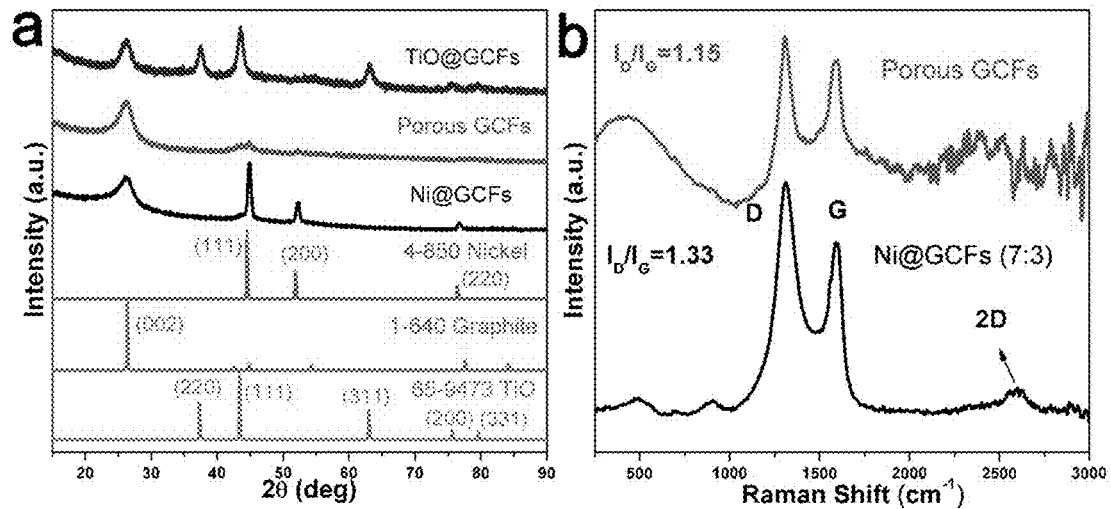
FIGS. 23(a)-23(b) are (a) XRD spectra of Ni@GCFs, porous GCFs and TiO@GCFs, (b) Raman spectra of Ni@GCFs (7:3) and porous GCFs.
Figures 24A, 24B:
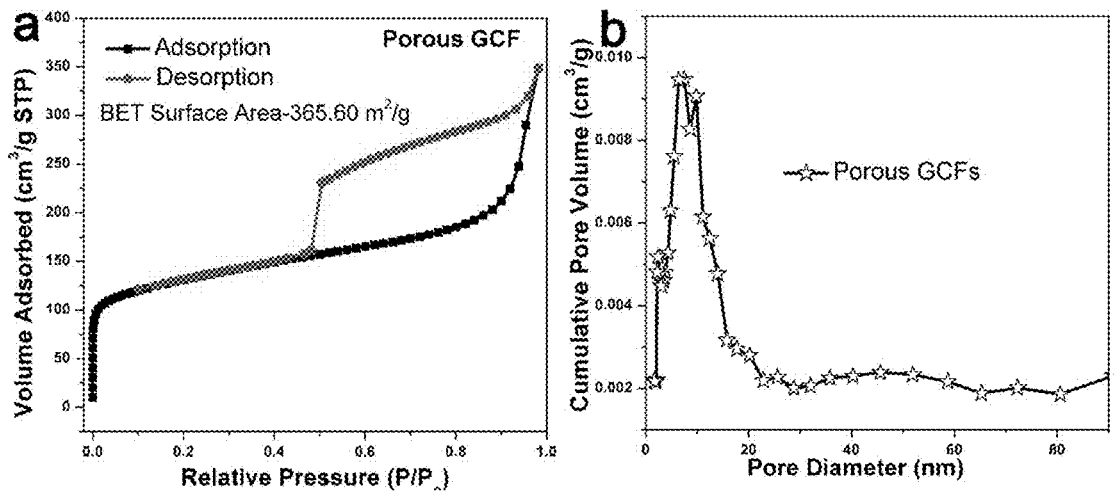
FIGS. 24(a)-24(b) are (a) BET adsorption/desorption isotherm and (b) pore distribution of porous GCFs.
Figures 25A, 25B:
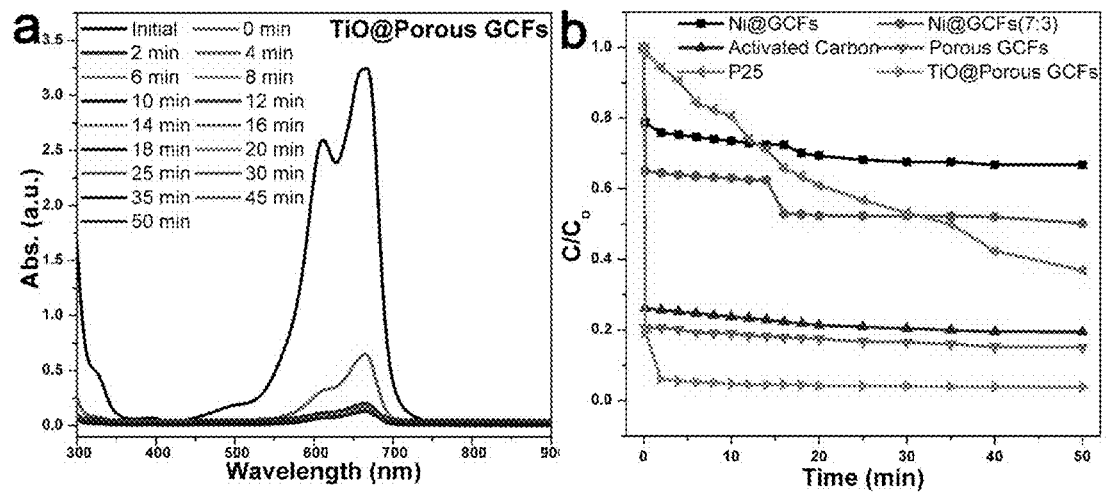
FIGS. 25(a)-25(b) are (a) UV-vis spectra of MB solution taken at different intervals of photocatalytic degradation experiment by TiO@Porous GCFs, (b) The ratio change of UV-vis adsorption intensity of MB solution taken at different intervals of photocatalytic degradation by Ni@GCFs, Ni@GCFs (7:3), porous GCFs, activated carbon, P25 and TiO@Porous GCFs
Figures 26A, 26B, 26C, 26D, 26E, 26F:
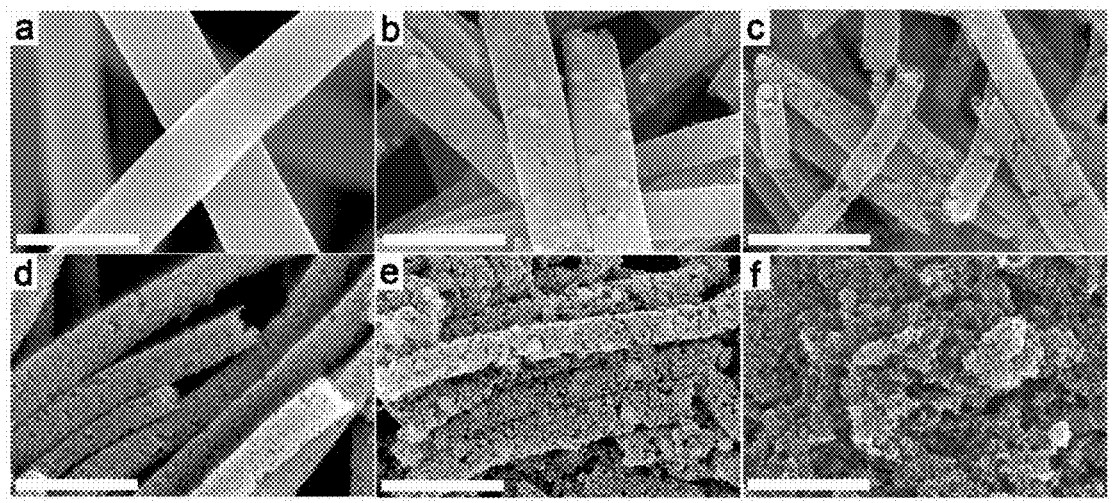
FIGS. 26(a)-26(f) are SEM images of (a) Ni/PAN, (b) Ni@GCFs, (c) Ni@GCFs (7:3), (d) porous GCFs, (e) TiO@ GCFs and (f) activated carbon powders.

In accordance with an exempalry embodiment, a two-step strategy was used to fabricate 1D porous metal@GCFs. In an exemplary synthesis process, a homogenous solution of Ni(OAc)$_2$ and PAN in DMF with specific concentrations and ratios that modulate the requisite viscosity and electrical conductivity for electrospinning. Polyacrylonitrile (PAN) was chosen as the polymer carrier for Ni metal salts because it is not only known to convert to graphitic carbon at high temperatures, and its pendant group is a nitrile moiety, which can bind to d-orbital of Ni element. Parameters for electrospinning were controlled to obtain fine PAN nanofibers containing a certain ratio of Ni salts with desired aspect ratio. As-made Ni/PAN nanofibers exhibit a fibrous morphology with a uniform diameter of approximately 633 nm (FIG. 26(a)). After pre-oxidation of Ni/PAN nanofibers at 250° C. for 4 h under air conditions and thermal treatment at 800° C. for 3 h in an inert atomosphere (5% H$_2$/N$_2$), the Ni/PAN nanofibers were converted into 3D nanoarchitectures containing 1D porous carbon fibers, graphene nanorings and monodispersed Ni nanoparticles (FIGS. 22(a)-22(c) and FIG. 26(b)). The resulting Ni nanoparticles with high surface area, which are in close proximity to the polymer (amorphous carbon), catalyze the graphitization of amorphous carbon into graphitic carbon at a significantly reduced temperature (800° C.), which leads to the formation of porous graphitic CNFs. Moreover, the amorphous carbon minimizes the crystal growth of the Ni nanoparticles due to a reduced diffusivity of Ni ions during the time required for the complete reduction of metal ions by the reducing atmosphere. High-resolution TEM image (FIG. 22(c)) further indicates the graphitic nature of carbon fibers and well-crystalized Ni nanoparticles after annealing at 800° C. under inert atmospheres, which is consistent with the XRD results (FIG. 23(a)) showing the characteristic XRD peaks of Ni (JPCDS card #4-850) and graphite (JPCDS card #1-640). The fullerene-like pores clearly exhibit well-ordered graphene layers with a d-spacing of 3.4 A, which corresponding to the (002) planes of graphite. The graphitic wall of pores range between approximately 10 and 40 graphene layers, which not only hold the catalytic Ni NPs but also improve the electrical conductivity of the carbon matrix, which is vital for the catalytic process.

Figures 27A, 27B:
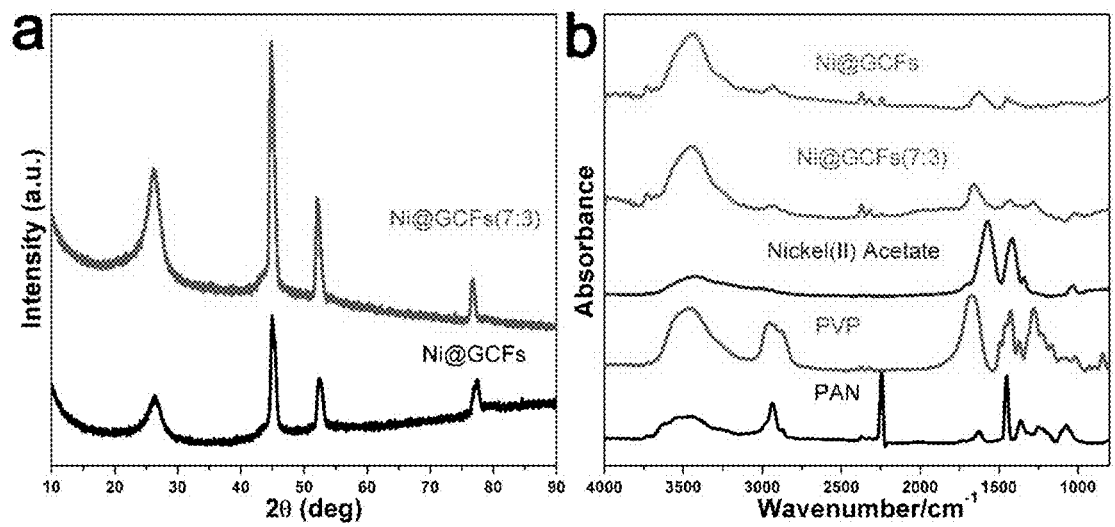
FIGS. 27(a)-27(b) are (a) XRD and (b) FTIR spectra of Ni@GCFs and Ni@GCFs (7:3).
Figures 28A, 28B, 28C, 28D:
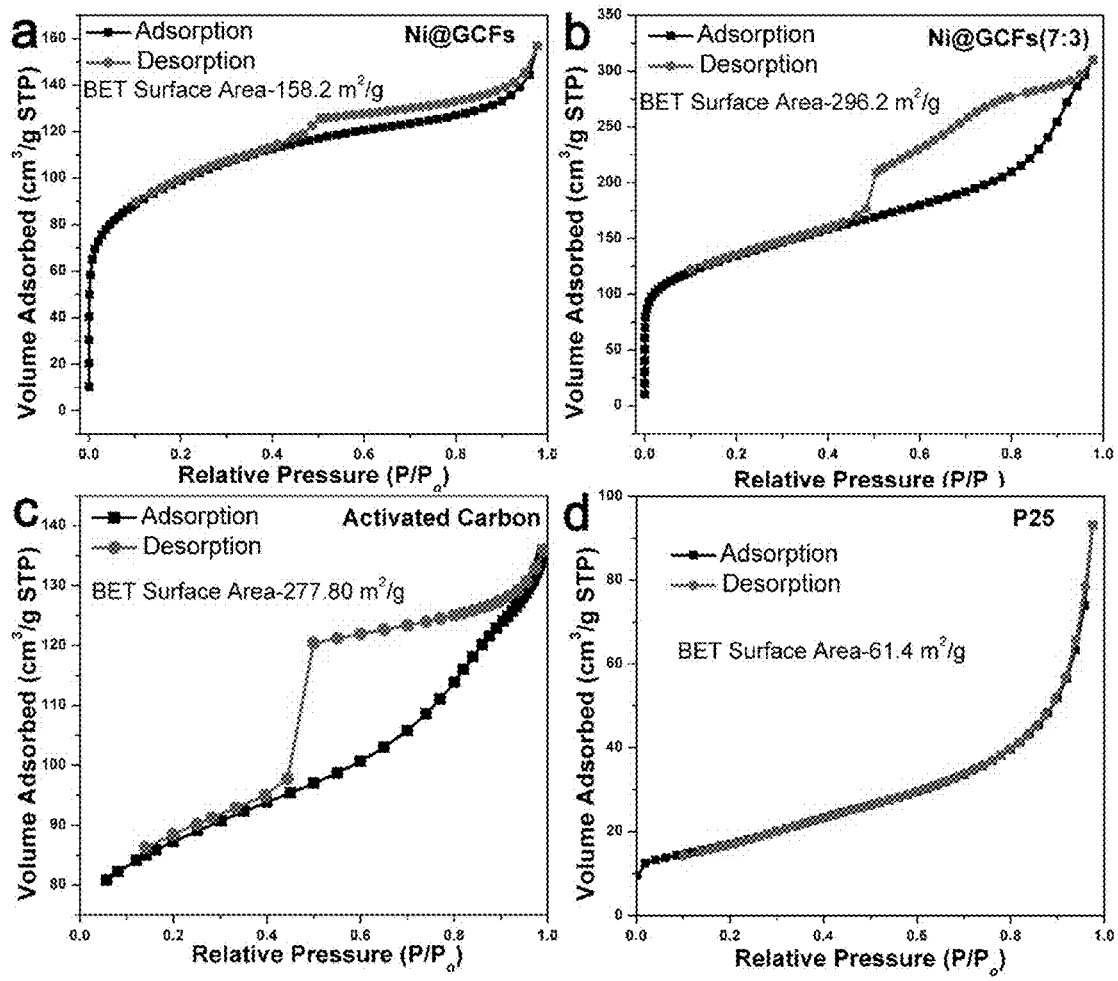
FIGS. 28(a)-28(d) are BET adsorption/desorption isotherm of (a) Ni@GCFs, (b) Ni@GCFs (7:3), (c) activated carbon and (d) P25.

Besides pure PAN polymer fibers, some percentage of PVP can mix with PAN in DMF solution with Ni salts for electrospinning aiming to improve the porosity of resulted Ni@GCFs. That is because PVP has much lower carbonization temperature (~400° C.) than PAN (~800° C.), which means it will be combusted much earlier than 800° C., leaving more void space and improve the mass diffusion to facilitate the crystallization of Ni and carbon graphitization. As seen from FIG. 26(c), the increased porosity can be observed compared the one without PVP (FIG. 26(b)). XRD spectra (FIG. 27(a)) confirm the larger Ni nanoparticles and more graphitized carbon fibers, which can be seen from the much larger half-peak width of Ni (111) and graphite (002) peaks. FTIR (FIG. 27(b)) demonstrates that the addition of PVP did not apparently change the functional groups of residual carbon after thermal treatment.

In order to further illuminate the graphitic carbon structures and optimize porosity, Ni@GCFs was treated in concentrated FeCl$_3$/HCl to remove the Ni NPs, leaving only the graphitic carbon nanorings to obtain porous GCFs. As seen from FIG. 26(d) and FIGS. 22(d)-22(f), the etched 1D porous graphitic carbon nanofibers are consisted of numerous overlapped graphene nanorings of ~20 nm diameters without any visible Ni nanoparticles, further noting the catalytic effects of encapsulated Ni nanoparticles. XRD further confirm the total removal of Ni NPs after acid leaching treatment, which can be seen from the disappearance of characteristic peaks of Ni nanocrystals and preservation of graphite ones. Raman spectra (FIG. 23(b)) shows the distinct D and G peaks of carbon species in GCFs, indicating the graphitization of carbon fibers during the annealing process. Moreover, the D/G ratio of GCFs decrease a little after the acid leaching process, the reason of which can be that some of unstable or disordered carbon was etched away by the highly oxidative acid solution and result in larger D/G ratio. In addition, to incorporate photocatalytic Ti oxides into the backbones of porous graphitic carbon fibers to endow GCFs with photocatalytic activity, GCFs were soaked with Ti precursors and further annealed in air to induce the crystallization of Ti salts and growth into the architectures of graphitic nanorings. Figure S1e clearly shows the 1D porous graphitic carbon fibers with TiO$_x$, which seems to be more porous and graphitic. From TEM (FIGS. 22(g)-22(h)) and HRTEM (FIG. 22(i)) the highly porous carbon backbones consisted with graphitic nanorings can be observed. Moreover, some small nanoparticles can be seen inside/outside of graphitic onions, which can be ascribed to TiO from their characteristic d-spacing of TiO (111). Besides, XRD can also provide a direct proof of formation of O-deficient TiO (JPCDS card #65-9473), which may be caused by the reductive carbon species within the GCFs or the limited diffusion of air to help the full oxidation of Ti precursors. It is worth to note that the O-deficient nature of TiO can induce the formation of impurity energy levels between the LOMO and HOMO of TiO and help the utilization of visible light in solar spectrum. Also the O vacancy can act as an electron sink to facilitate the separation of radiated electrons and holes, increasing the overall photocatalytic efficiency.

Figure 29:
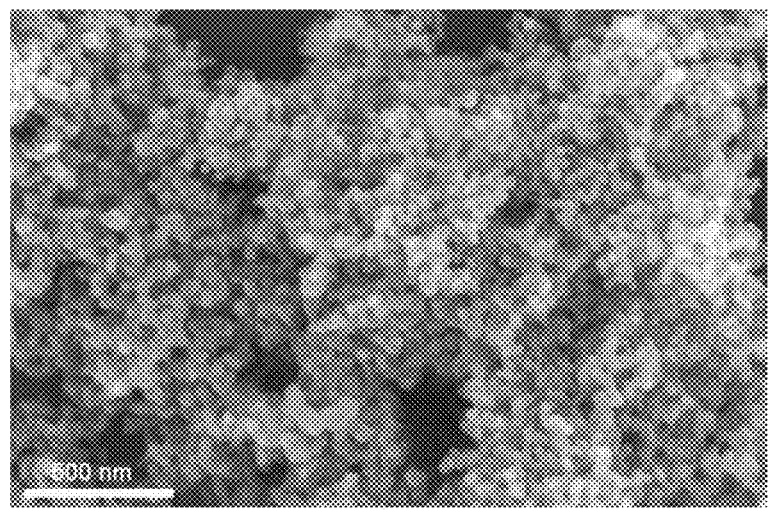
FIG. 29 are SEM images of commercial P25 particles.
Figures 30A, 30B, 30C, 30D:
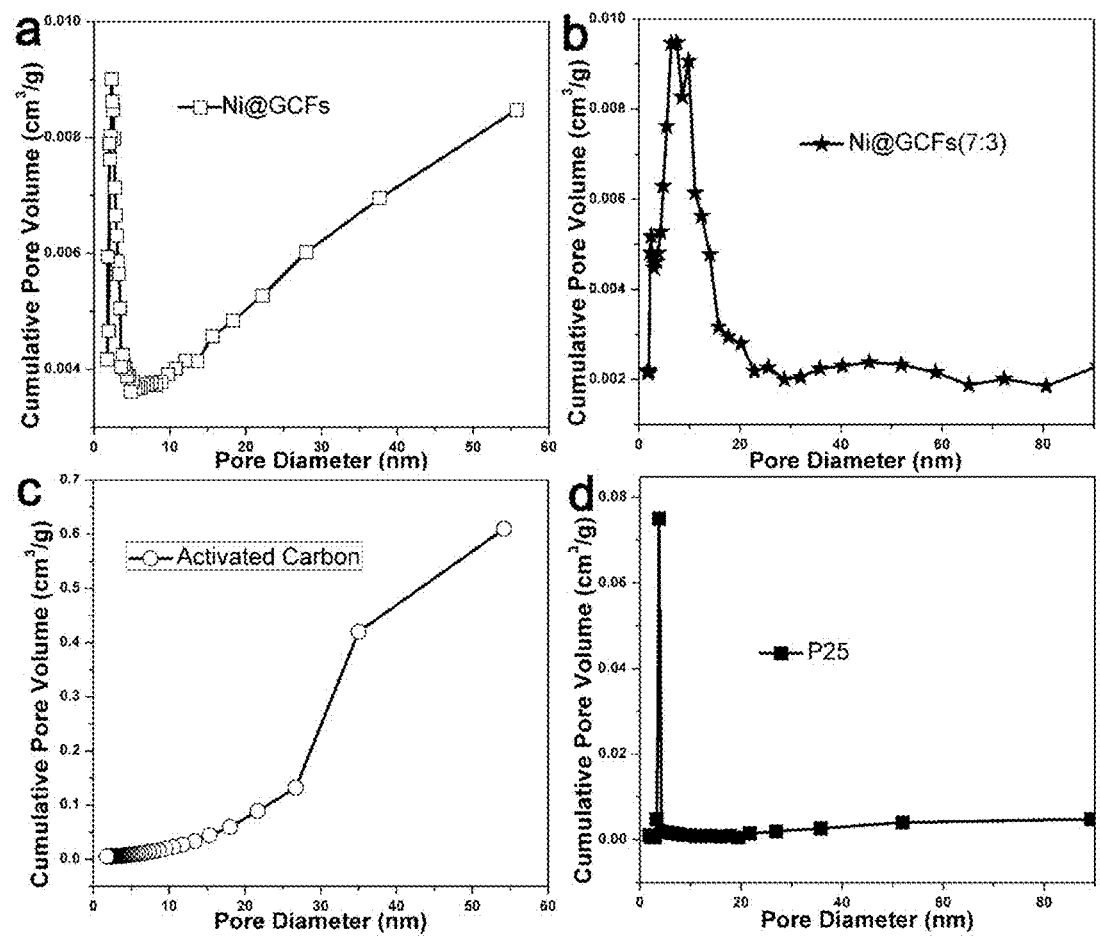
FIGS. 30(a)-30(d) are pore distribution of (a) Ni@GCFs, (b) Ni@GCFs (7:3), (c) activated carbon and (d) P25.
Figures 31A, 31B, 31C, 31D:
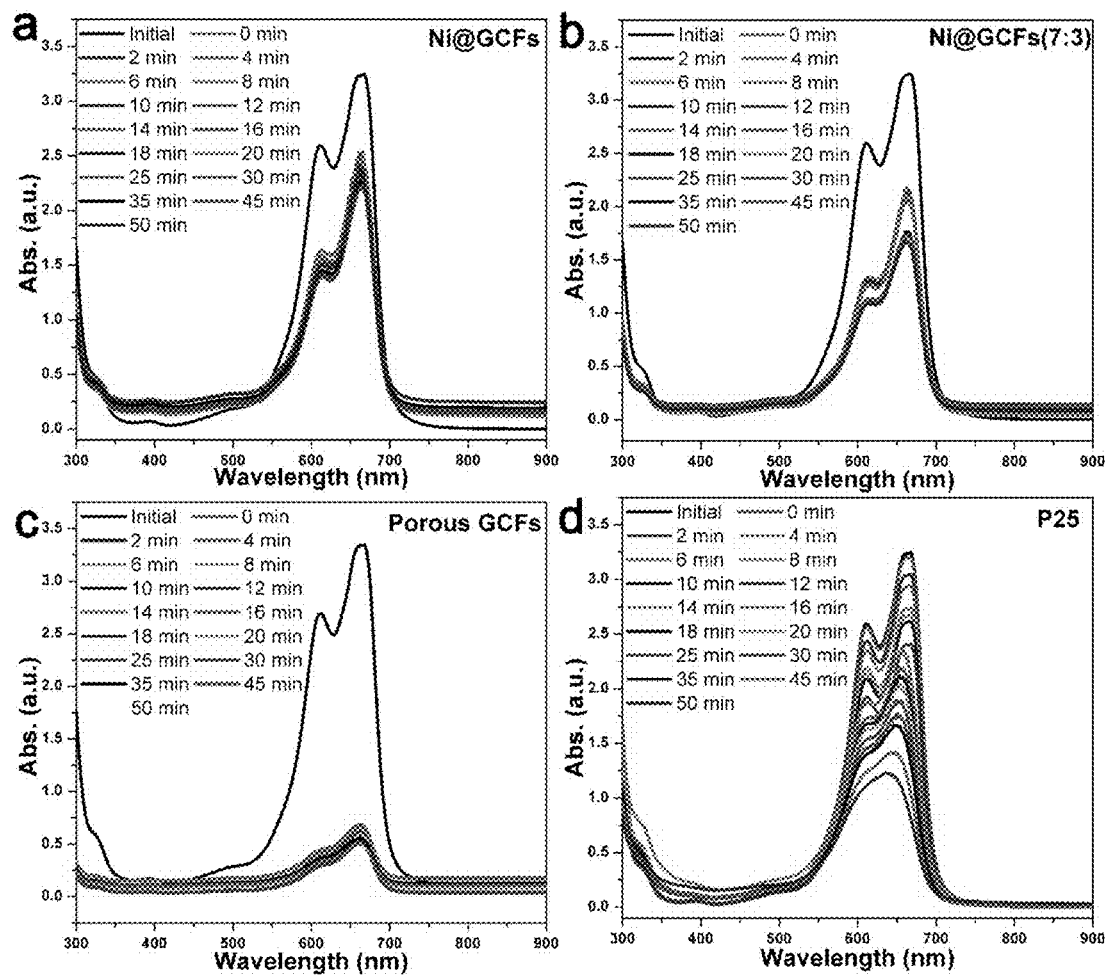
FIGS. 31(a)-31(d) are UV-vis spectra of MB solution taken at different intervals of photocatalytic degradation experiment by Ni@GCFs, Ni@GCFs (7:3), porous GCFs, activated carbon, P25.
Figure 32:
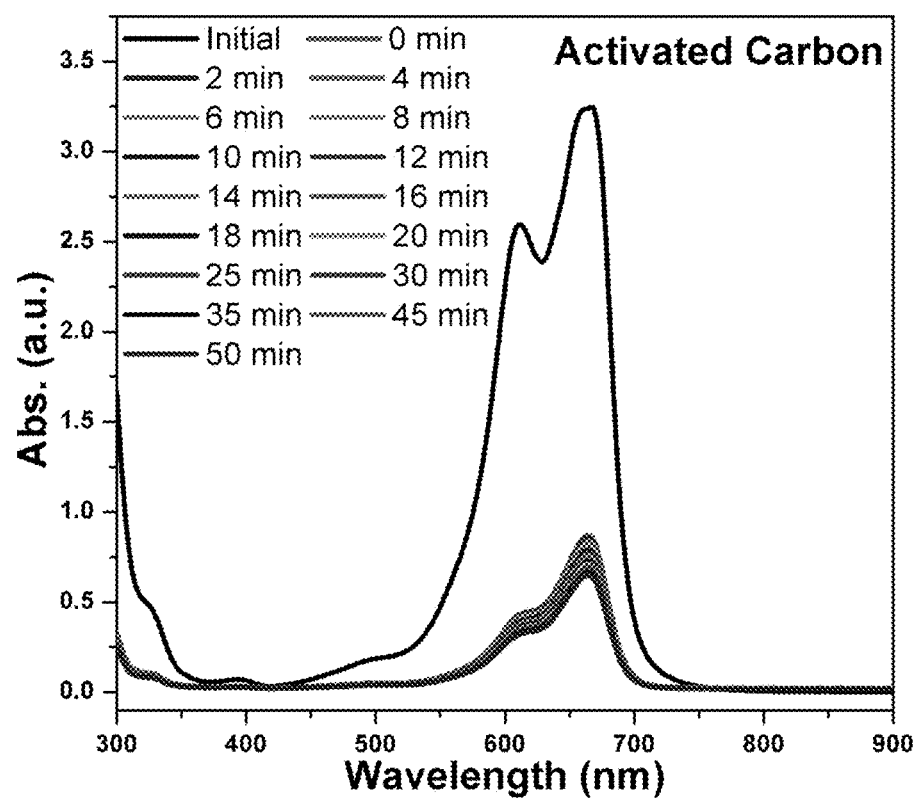
FIG. 32 is a UV-vis spectra of MB solution taken at different intervals of photocatalytic degradation experiment by activated carbon.

Surface area and pore distribution of different kinds of GCFs were evaluated by Brunauer-Emmett-Teller (BET) to verify the effects of component and structure control, which are important parameters and play decisive role in final adsorption capability of activated carbon fibers. As shown by FIGS. 28(a)-28(d) and FIG. 24(a), the initial surface area of Ni@GCFs is 158.2 m$^2$/g, which can be increased to 296.2 m$^2$/g by the addition of some sacrificial PVP in electrospun PAN solution. Moreover, after removing the Ni nanoparticles by acid leaching, the surface area can be further increase to 365.6 m$^2$/g, which is much larger than that of commercial activated carbon powders (277.8 m$^2$/g, Figure S3c and Figure S1f) and P25 (61.8 m$^2$/g, FIG. 28(d) and FIG. 29). Moreover, the average pore size of GCFs (FIG. 24(b) and FIGS. 30(a)-30(d) also increase with the addition of PVP and acid leaching by the Barrett-Joyner-Halenda (BJH) method. The enlarged surface area and pore size of porous GCFs can greatly facilitate the adsorption of contamination molecule in wastewater and the mass and charge diffusion during the photocatalytic process.

To evaluate the water purification performance of various porous GCFs, methylene blue (MB) was chosen as the model pollutant for photocatalytic degradation studies. When irradiated with UV (A) light in the absence of the porous GCFs and P25, no obvious degradation of MB was observed; therefore direct photolysis was negligible at all experimental conditions considered. However, when mixing GCFs with MB solution, a rapid adsorption and decrease on the UV adsorption intensity of MB supernatant after separation by centrifugation happens, which can be ascribed to excellent adsorption capability by the well-engineered pore structures and surface properties. Notably, porous GCFs after acid leaching shows a 80% adsorptive removal of MB at the constant of mixing, which is much higher than that of Ni@GCFs and Ni@GCFs (7:3), even much better than commercial activated carbon powders, which benefit from the improved porosity by the PVP addition and acid leaching. Moreover, benefited from the synergistic effect of porous GCFs and photocatalytic TiO, the removal of MB reach an optimal of 96% with the incorporation of O-deficient titanium oxide into the backbones of GCFs, which is much better than that of Ni@GCFs (32.8%), Ni@GCFs (7:3) (49.7%), activated carbon (80.8%) and P25 (63.1%) after 50 mins of irradiation of UV lights.

In accordance with an exemplary embodiment, an electrospun-annealing method is disclosed, which produces one-dimensional (1D) nanoporous graphitic carbon fibers embedded with active photocatalytic TiO components. By controlling the electrospun parameters and combined with acid leaching, the component, surface area and pore structure of obtained GCFs were well engineered to optimize its photocatalytic and water adsorption capability towards removal of methylene blue. Compared with commercial activated carbon powders and P25, the nanoporous TiO@GCFs demonstrated a fast and total 96% removal of MB in less than 5 minutes, which can be ascribed to the synergistic effects of great adsorption capability of the well-engineered porous structures and photocatalytic O-deficient TiO$_x$. Thus, a novel insight into the design of functional porous carbon nanofibers for their application in environmental remediation is disclosed.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A nanocomposite comprising:
one-dimensional porous nitrogen doped graphitic carbon fibers embedded with oxygen reduction reaction (ORR) components, the ORR components being surrounded by graphitic nanorings, and wherein the ORR components are nickel (Ni) nanoparticles and wherein the graphitic nanorings are concentric graphitic nanorings consisting of 10 graphene layers to 40 graphene layers.

2. The nanocomposite according to claim 1, wherein the nanocomposite is Ni@N-GCFs (nitrogen-doped graphitic carbon fibers).

3. The nanocomposite according to claim 1, wherein the nanocomposite is used in a fuel cell catalyst.

4. The nanocomposite according to claim 1, wherein the nanocomposite is used in a battery.

5. The nanocomposite according to claim 1, wherein the nanocomposite is used in a water purification system.

6. The nanocomposite according to claim 1, wherein the nanocomposite is used in opto-electronics including light emitting or absorbing materials.

7. The nanocomposite according to claim 1, wherein the nanocomposite has a diameter of 633 nm to 634 nm.

8. The nanocomposite according to claim 1, wherein the nanocomposite is NiO@N-GCFs (nitrogen-doped graphitic carbon fibers).

9. A nanocomposite comprising:
one-dimensional porous nitrogen doped graphitic carbon fibers embedded with oxygen reduction reaction (ORR) components, the ORR components being surrounded by fullerene-form graphitic walls, and wherein the ORR components are nickel (Ni) nanoparticles and wherein the fullerene-form graphitic walls range between 10 graphene layers to 40 graphene layers.

10. The nanocomposite according to claim 9, wherein the nanocomposite is Ni@N-GCFs (nitrogen-doped graphitic carbon fibers).

11. The nanocomposite according to claim 9, wherein the nanocomposite is used in a fuel cell catalyst.

12. The nanocomposite according to claim 9, wherein the nanocomposite is used in a battery.

13. The nanocomposite according to claim 9, wherein the nanocomposite is used in a water purification system.

14. The nanocomposite according to claim 9, wherein the nanocomposite is used in opto-electronics including light emitting or absorbing materials.

15. The nanocomposite according to claim 9, wherein the nanocomposite is NiO@N-GCFs (nitrogen-doped graphitic carbon fibers).

* * * * *